United States Patent [19]
Waymouth et al.

[11] Patent Number: 5,594,080
[45] Date of Patent: Jan. 14, 1997

[54] THERMOPLASTIC ELASTOMERIC OLEFIN POLYMERS, METHOD OF PRODUCTION AND CATALYSTS THEREFOR

[75] Inventors: Robert M. Waymouth; Geoffrey W. Coates, both of Palo Alto, Calif.; Elisabeth M. Hauptman, Wilmington, Del.

[73] Assignee: Leland Stanford, Jr. University, Stanford, Calif.

[21] Appl. No.: 218,210

[22] Filed: Mar. 24, 1994

[51] Int. Cl.⁶ .......................... C08F 4/643; C08F 4/642; C08F 10/06
[52] U.S. Cl. ............... 526/126; 526/134; 526/160; 526/170; 526/127; 526/351; 526/352; 526/348.11; 526/348.5; 526/348.6; 526/943; 502/103; 502/117; 502/152; 502/153; 556/11; 556/53; 534/15; 534/11
[58] Field of Search ...................... 526/126, 127, 526/134, 160, 170, 943; 502/103, 117, 152, 153; 556/11, 53; 534/11, 15

[56] References Cited

U.S. PATENT DOCUMENTS

| | | | |
|---|---|---|---|
| 3,112,300 | 11/1963 | Natta et al. | 260/93.7 |
| 3,112,301 | 11/1963 | Natta et al. | 260/93.7 |
| 3,175,999 | 3/1965 | Natta et al. | 260/93.7 |
| 4,298,722 | 11/1981 | Collette et al. | 526/348 |
| 4,335,225 | 6/1982 | Collette et al. | 525/240 |
| 4,542,199 | 9/1985 | Kaminsky et al. | 526/160 |
| 4,874,880 | 10/1989 | Miya et al. | 556/63 |
| 5,118,768 | 6/1992 | Job et al. | 526/124 |
| 5,279,999 | 1/1994 | DeBoer et al. | 502/117 |
| 5,304,614 | 4/1994 | Winter et al. | 526/127 |
| 5,385,877 | 1/1995 | Fujita et al. | 502/103 |
| 5,391,661 | 2/1995 | Naganuma et al. | 526/133 |

FOREIGN PATENT DOCUMENTS

| | | |
|---|---|---|
| 277003A1 | 8/1988 | European Pat. Off. . |
| 277004A1 | 8/1988 | European Pat. Off. . |
| 0427697A2 | 5/1991 | European Pat. Off. . |
| 0475306A1 | 3/1992 | European Pat. Off. . |
| 300293 | 9/1989 | Germany . |
| 4125135A1 | 2/1993 | Germany . |
| PCT/NL93/ 00229 | 3/1993 | WIPO . |

OTHER PUBLICATIONS

G. Erker et al. (1993) J Am Chem Soc 115, 4590–4601 (Jun. 3, 1993).

(List continued on next page.)

*Primary Examiner*—Mark Nagumo
*Attorney, Agent, or Firm*—Oblon, Spivak, McClelland, Maier & Neustadt, P.C.

[57] ABSTRACT

This invention is directed to novel catalysts the structure and activity of which can be controlled to produce a wide range of alpha olefin polymers and co-polymers, and preferably for the production of stereoblock poly alpha olefins comprising a wide range of preselected amorphous and crystalline segments for precise control of the physical properties thereof, principally elastomeric thermoplastic properties. More specifically, this invention is directed to novel catalysts and catalysts systems for producing stereoblock polypropylene comprising alternating isotactic and atactic diastereosequences, which result in a wide range of elastomeric properties. The amount and numbers of crystalline sections, the isotactic pentad content, the number and length of intermediate atactic chains and overall molecular weight are all controllable by the steric structure of the catalysts and the process conditions. The novel catalysts provided by the present invention are ligand-bearing non-rigid metallocenes the geometry of which can be controlled on a time scale that is slower than the rate of olefin insertion, but faster than the average time to construct (polymerize) a single polymer chain, in order to obtain a stereoblock structure in the produced polyolefins. The symmetry of the catalyst structure is such that upon isomerization the catalyst symmetry alternates between a chiral and an achiral geometry. This geometry alteration can be controlled by selecting ligand type and structure, and through control of polymerization conditions to precisely control the physical properties of the resulting polymers.

63 Claims, 3 Drawing Sheets

OTHER PUBLICATIONS

G. Erker and B. Teniwe J Am Chem Soc. 114, 4004–4006 (1992).

Two–State Propagation Mechanism for Propylene Polmerization Catalyzed by rac–[anti–Ethylidene(1–n$^5$–tetramethylcyclo–pentadienyl) (1–n$^5$–indenyl)dimethyltitanium], by James C. W. Chien, Geraldo Hidalgo Llinas, Marvin D. Rausch, G.-Y. Lin and H. Henning Winter; J. Am. Chem. Soc. 1991, 113, 8569–8570.

Elastomeric Polypropylenes from Alumina–Supported Tetraalkyl Group IVB Catalysts. 1. Synthesis and Properties of High Molecular Weight Stereoblock Homopolymers; 2. Chain Microstructure, Crystallinity, and Morphology, by J. W. Collette, D. W. Ovenall, W. H. Buck and R. C. Ferguson, Macromolecules, 1989, 22, 3858.

Mechanisms of Stereochemical Control in Propylene Polymerizations with Soluble Group 4B, Metallocene/Methylalumoxane Catalysts, John A. Ewen, Contribution from the Long Range Polymer Group, Plastics Technology Division, Exxon Chemical Company, Baytown TX; J. Am. Chem. Soc. 1984, 106, 6355–6364.

Crystal Structures and Stereospecific Propylene Polymerizations with Chiral Hafnium Metallocene Catalysts, John A. Ewen and Luc Haspeslagh; J. Am. Chem. Soc. 1987, 109, 6544–6545.

Syndiospecific Propylene Polymerizations with Group 4 Metallocenes, John A. Ewen, Robert L. Jones, A. Razavi; J. Am. Chem. Soc. 1988, 110, 6255–6256.

Polymerization of Propene and Butene with a Chiral Zirconocene and Methylalumoxane as Cocatalyst, by Walter Kaminsky, Klaus Kulper, Hans H. Brintzinger and Ferdinand R. W. P. Wild, Chem. Int. Ed. Engl. 24 (1985) No. 6, p. 507.

"Cation–like" Homogeneous Olefin Polymerization Catalysts Based upon Zirconecene Alkyls and Tris (pentafluorophenyl) borane, Tobin J. Marks, X. Yang, Charlotte L. Stern; J. Am. Chem. Soc. 1991, 113, 3623–3625.

Isospecific Polymerization of Propylene Catalyzed by rac–Ethylenebis(indenyl)methylzirconium "Cation", James C. W. Chien, Woei–Min Tsai and Marvin D. Rausch, J. Am. Chem. Soc. 1991, 113–8570–8571.

Base–Free Cationic 14–Electron Titanium and Zirconium Alkyls: In situ Generation, Solution Structures, and Olefin Polymerization Activity, by Manfred Bochmann, Andrew J. Jaggar and Julian C. Nicholls; Angew, Chem. Int. Ed. Engl. 29 No. 7 (1990).

Kinetic and Mechanistic Aspects of Propene Oligomerization with Ionic Organozirconium and –hafnium Compounds: Crystal Structures of [Cp*$_2$MMe](THT)$^+$[BPH$_4$]$^-$(M=Zr, Hf)$^1$ Jan H. Teuben, Johan J. W. Eshuis, Yong Y. Tan, Auke Meetsma, Organometallics 1992, 362–369.

Carbon–13 Nuclear Magnetic Resonance Quantitative Measurements of Average Sequence Lengths of Like Sterochemical Additions in Polypropylene and Polystyrene, by James C. Randall, Phillips Petroleum Company, Research and Development, Bartlesville, Oklahoma 74004; Journal of Polymer Science: Polymer Physics Edition, vol. 14, 2083–2094 (1976).

Communications to the Editor; Model Compounds and $^{13}$C NMR Observation of Stereosequences of Polypropylene, Macromol. vol. 8, No. 5, Sep.–Oct. 1975, pp. 687–689.

Chapter 5, Poly–a–Olefin Based Thermoplastic Elastomers, Thermoplastic Elastomers, A Comprehensive Review, Edited by N. R. Legge, G. Holden, H. E. Schroeder, Distributed in the U.S.A. by MacMillian Publishing Company, New York and in Canada by Collier Macmillan Canada, Inc., Ontario, pp. 92–116.

Geoffrey W. Coates and Robert M. Waymouth, Enantioselective Cyclopolymerization of 1,5–Hexadiene Catalyzed by Chiral Zirconocenes: A Novel Strategy for the Synthesis of Optically Active Polymers with Chirality in the Main Chain, Contribution from the Department of Chemistry, Stanford University, Stanford, California 94305, Received Jul. 6, 1992, Reprinted from the Journal of the American Chemical Society, 1993, 115, pp. 91–98.

K. B. Wagener, Department of Chemistry, University of Florida, Gainesville, FL 32611–7200, Oscillating Catalysts: A New Twist for Plastics, Science, vol. 267, 13 Jan. 1995.

Geoffrey W. Coates and Robert M. Waymouth, Oscillating Stereocontrol: A Strategy for the Synthesis of Thermoplastic Elastomeric Polypropylene, Science vol. 267, 13 Jan. 1995, pp. 217–219.

Elastomeric Polypropylene Oscillating Catalyst Controls Microstructure, News of the Week (U.K. newspaper), 16 Jan. 1995, C&EN, pp. 6–7.

Cooperative Effects in Binuclear Zirconocenes; Their Synthesis and Use as Catalyst in Propene Polymerization, Stephan Jungling and Rolf Mulhaupt, Journal of Organometallic Chemistry, 460 (1993) 191–195.

Metallocene Catalysts for Olefin Polymerizations. XXIV. Stereoblock Propylene Polymerization Catalyzed by rac–[anti–Ethylidene] (1–n$_5$–Tetramethylcyclopentadienyl)(1–n$^5$–Idenyl) dimethyltitanium: A Two–State Propagation*; James Chien, Gerald H. Llinas et al; Journal of Polymer Science, Part A: Polymer Chemistry, vol. 30, 2601–2617 (1992).

Consecutive Two–State Statistical Polymerization Models; H. N. Cheng, G. N. Babu et al.; Department of Polymer Science and Engineering, University of Massachusetts, Amherst, Massachusetts; Macromolecules 1992, 25, 6980–6987.

Crystalline–Amorphous Block Polypropylene and Nonsymmetric ansa–Metallocene Catalyzed Polymerization, G. Llinas, H. Dong et al., Departments of Polymer Science and Engineering, Chemistry and Chemical Engineering, University of Massachusetts, Amherst, Massachusetts; Macromolecules 1992, 25, 1242–1253.

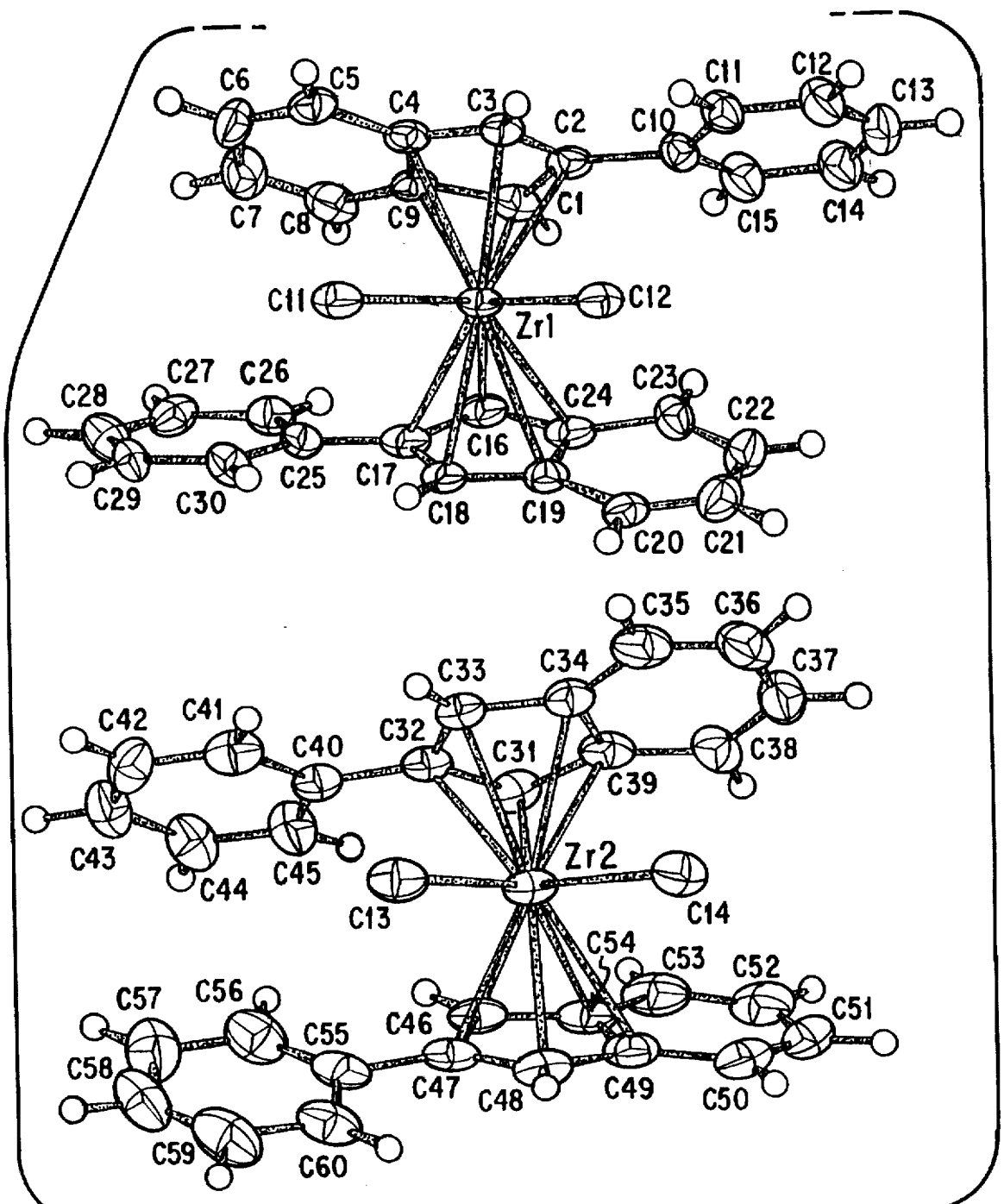
Fig_1

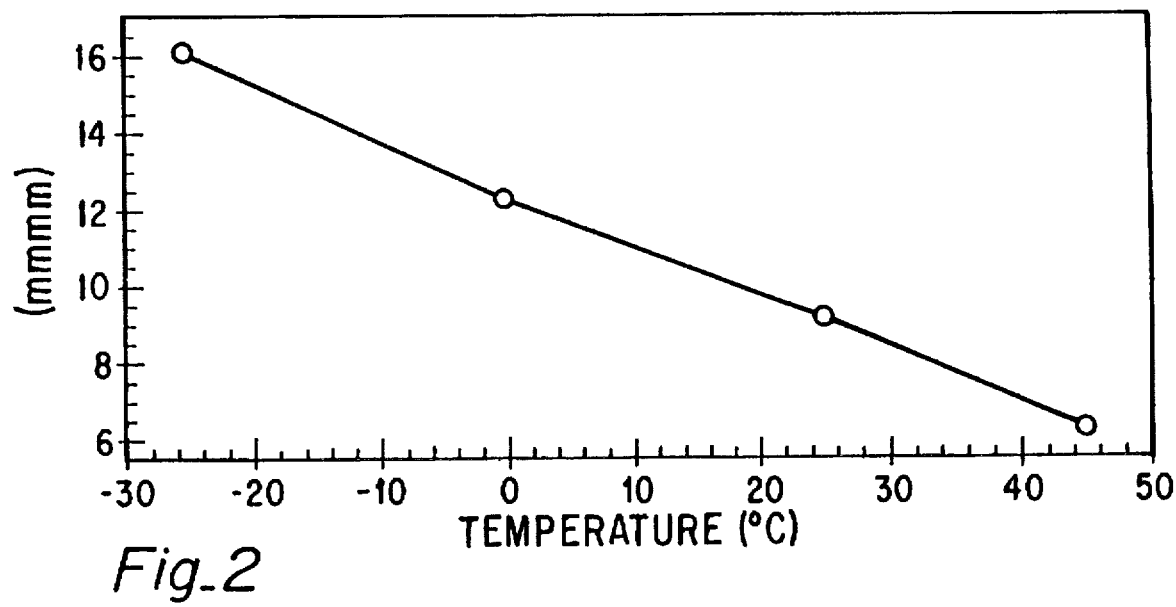
Fig_2
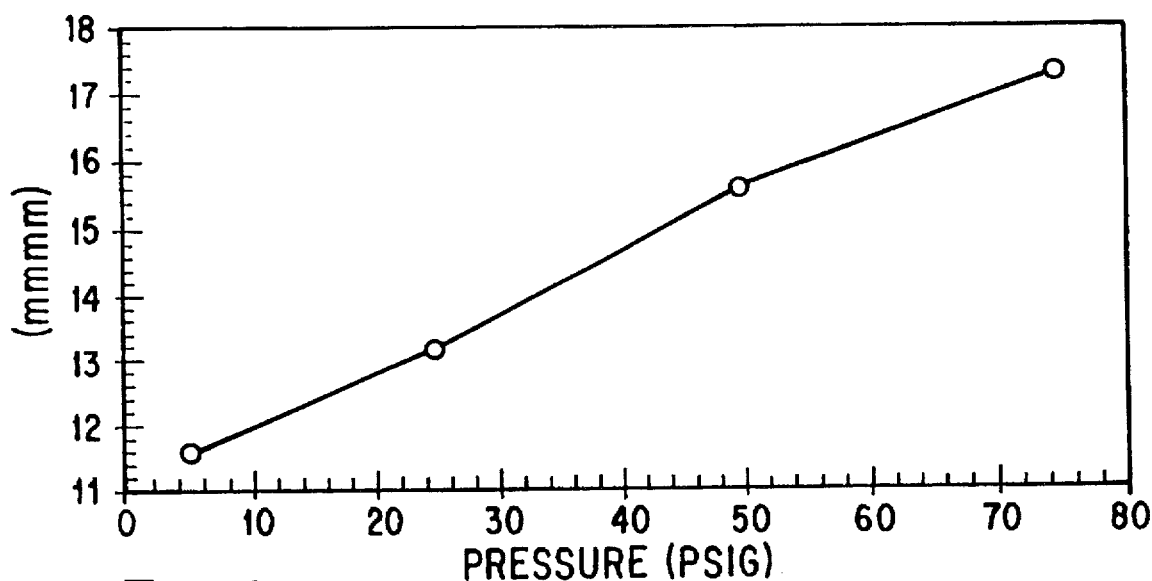
Fig_3

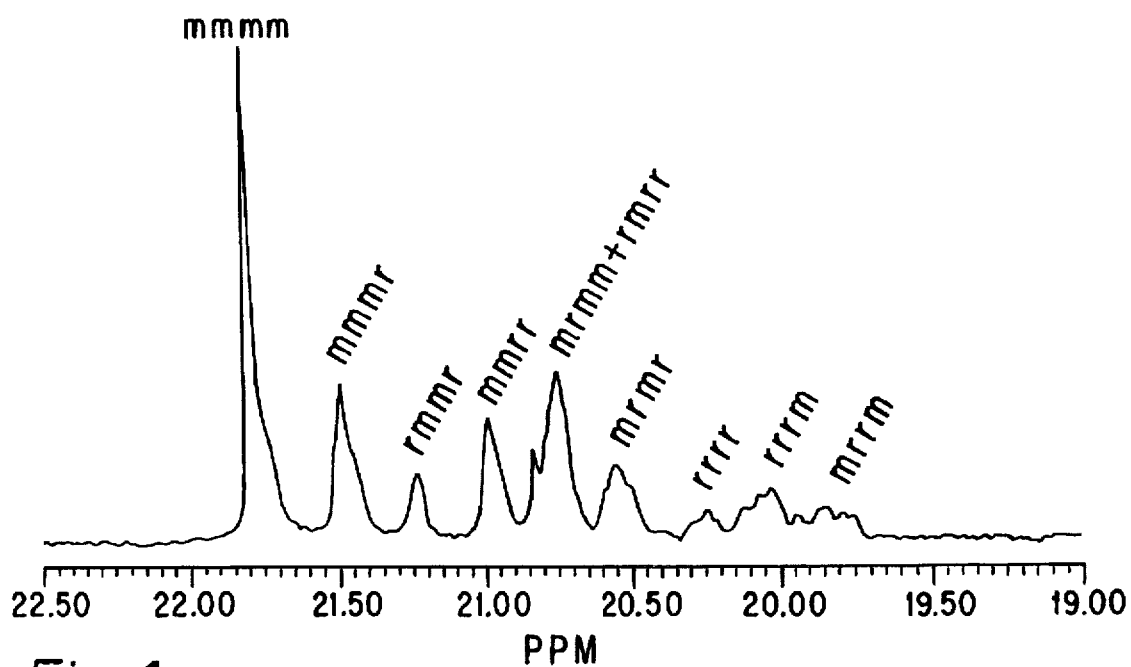
Fig_4
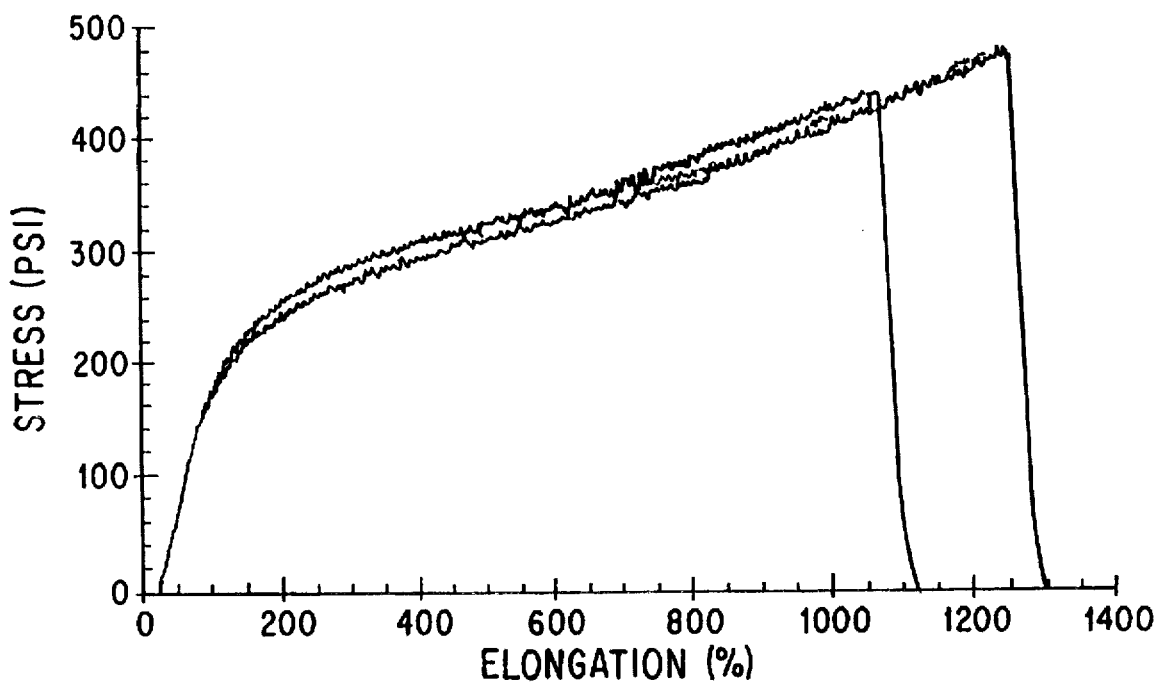
Fig_5

THERMOPLASTIC ELASTOMERIC OLEFIN POLYMERS, METHOD OF PRODUCTION AND CATALYSTS THEREFOR

SPECIFICATION

1. Field

This invention relates to novel catalysts, catalyst systems and methods of production of olefin polymers, particularly crystalline and amorphous block polymers by use of the novel catalysts of the invention. A principal area of interest is the preparation and use of novel cyclopentadienyl or indenyl metallocene catalysts to produce elastomeric stereoblock polymers, and methods of control of catalyzed polymeric reactions to produce polymers having properties ranging from crystalline thermoplastics to thermoplastic elastomers to amorphous gum elastomers.

2. Background

Crystalline, amorphous, and elastic polypropylenes are known. Crystalline polypropylenes are generally regarded as comprising of predominantly isotactic or syndiotactic structures and amorphous polypropylene is regarded as comprising predominantly of an atactic structure. U.S. Pat. Nos. 3,112,300 and 3,112,301 both to Natta, et al. describe isotactic and prevailingly isotactic polypropylene.

U.S. Pat. No. 3,175,199 to Natta et al. describes an elastomeric polypropylene which can be fractionated out of a polymer mixture containing prevailingly isotactic and atactic polypropylenes. When separated from the polymer mixture, a fraction of this polymer showed elastomeric properties which were attributed to a stereoblock structure comprising alternating blocks of isotactic and atactic stereosequences.

Previously, the catalysts used to produce stereoblock amorphous crystalline polypropylenes consisted of heterogeneous catalysts comprising titanium or vanadium halides on a support (Natta and Crespi 1965; German Patent DD 300,293 of Arnold et al.), or tetralkyl zirconium or titanium on a metal oxide support U.S. Pat. No. 4,335,225 of Collette (du Pont). These heterogeneous catalysts do not consist of single sites, but of multiple sites and thus produce a mixture of polymeric materials which can be fractionated by extraction into suitable solvents. The various fractions typically have different molecular weights and molecular weight distributions and vary in their physical properties.

Metallocene catalysts are capable of polymerizing alpha olefins to atactic, isotactic, or syndiotactic structures. In particular, rigid bridged indenyl metallocenes represented by the general structure A and B are known in the art where M=Ti, Zr, and Hf:

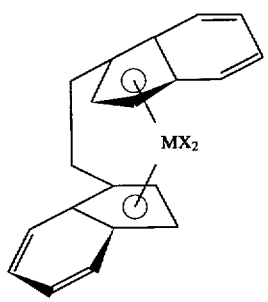

RACEMIC GEOMETRY

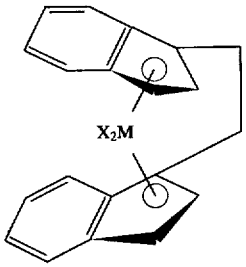

MESO GEOMETRY

As disclosed by Ewen ("Mechanisms of Stereochemical Control in Propylene Polymerizations with Soluble Group 4B Metallocene/Methylalumoxane Catalysts" J. Am. Chem. Soc. 1984, 106, 6355–6364), stereorigid catalysts of racemic geometry A produce isotactic polypropylene whereas stereorigid catalysts of meso geometry B produce atactic polypropylene.

A metallocene catalyst was disclosed which yields elastomeric polypropylene (Chien, Llinas et al. 1991 [Ref. 2]; Cheng, Babu et al. 1992 [Ref. 3]; Llinas, Dong et al. 1992 [Ref. 4]). This catalyst had rather low activity ($3.5 \times 10^5$ gm polymer/mol Ti.hr) and yielded polypropylenes with molecular weights less than $M_w=200,000$. This polymer was more homogeneous in its composition, and was completely soluble in diethyl ether. Polypropylene produced with this catalyst had melting points below 70° C., with elongations up to 1300% and tensile strength of 1750 psi.

Accordingly, there is a need for more active catalyst systems, the structure of which can be controlled in the reaction system during polymerization to produce a selected ratio of atactic/isotactic stereosequences, resulting in high molecular weight polymers with narrow molecular weight distributions having preselected properties, including thermoplastic elastomeric properties.

THE INVENTION

OBJECTS

It is the object of this invention to provide a new class of metallocene catalysts, and methods of polymerization employing the catalysts to produce a wide range of alpha olefin polymers, including isotactic-atactic stereoblock polymers having a broad range of structure, including isotactic stereosequences of varying lengths to provide a preselected range of properties, including highly elastomeric thermoplastic properties.

It is another object of this invention to provide stereo block alpha olefin polymers with preselected properties by control of catalyst substituents and process conditions.

It is another object of this invention to provide processes for preparation of a wide variety of stereoblock polymers through control of the catalyst geometry.

It is another object of this invention to provide a novel class of polymer systems, including stereoblock polymers having preselected properties.

Still other objects of the invention will be evident from the Summary, Descriptions, Drawings, and Claims of this application.

DRAWINGS

The invention is illustrated in part by references to the drawings in which:

FIG. 1 is a representation of a typical metallocene-complex catalyst of this invention employing two substituted indenyl ligands bound to zirconium, which crystallizes in both rotameric forms, a chiral, racemic rotamer 1a and an achiral, meso rotamer 1b;

FIG. 2 is a graphical representation of the influence of polymerization temperature on the microstructure of polypropylene produced with catalyst A;

FIG. 3 is a graphical representation of the influence of propylene pressure on the microstructure of polypropylene produced with catalyst A;

FIG. 4 is a representative $^{13}$C NMR specimen of the methyl pentad region of a polypropylene prepared with catalyst A (Example 23); and FIG. 5 is a representative stress-strain curve for a polypropylene obtained with catalysts of this invention (Example 16).

SUMMARY

This invention is directed to novel metallocene-complex catalysts the structure and activity of which can be controlled to produce a wide range of olefin polymers and co-polymers, and preferably for the production of stereoblock poly alpha-olefins comprising a wide range of preselected amorphous and crystalline segments for precise control of the physical properties thereof, principally elastomeric thermoplastic properties. More specifically, this invention is directed to novel metallocene catalysts and catalyst systems for producing stereoblock polypropylene comprising alternating isotactic and atactic diastereosequences, which result in a wide range of elastomeric properties. The amount and numbers of crystalline sections, the isotactic pentad content, the number and length of intermediate atactic chains and overall molecular weight are all controllable by the steric structure of the catalysts and the process conditions. The novel catalysts provided by the present invention are ligand-bearing non-rigid metallocenes the geometry of which can change on a time scale that is slower than the rate of olefin insertion, but faster than the average time to construct (polymerize) a single polymer chain, in order to obtain a stereoblock structure in the produced polyolefins. The symmetry of the catalyst structure is such that upon isomerization the catalyst symmetry alternates between a chiral and an achiral geometry. This geometry alteration can be controlled by selecting ligand type and structure, and through control of polymerization conditions to precisely control the physical properties of the resulting polymers.

This invention includes a novel process for tailoring the block size distribution and resulting properties of the polymer such as melting point, tensile set and tensile strength by varying the structure of the catalyst and the conditions of the polymerization reaction.

In a preferred embodiment the catalysts and methods of this invention produce a novel class of elastomeric polymers comprising units derived from propylene, which have a high molecular weight and a narrow molecular weight distribution, which are homogeneous in their composition. By homogeneous in composition, we mean that if the polymer can be fractionated by whatever solvent or solvent system(s), all the polymer fractions have similar molecular weights and molecular weight distributions.

The thermoplastic elastomeric polypropylenes of this invention exhibit elongations from 20% to 5000%, preferably between 100% and 3000% with tensile sets between 10% and 300%, preferably between 30% and 200%, and most preferably between 30% and 70%. Tensile strengths for these polypropylenes range from 100 psi to 6000 psi, preferably between 400 psi and 5000 psi. The crystallinity of the polymers range from amorphous materials with no melt, to crystalline thermoplastics with melting points of 161° C. Preferably the melting points range from 50° to 145° C.

The catalyst system of the present invention consists of the transition metal component metallocene in the presence of an appropriate cocatalyst. In broad aspect, the transition metal compounds have the formula:

Formula 1 in which M is a Group 3, 4 or 5 Transition metal, a Lanthanide or an Actinide, X and X' are the same or different hydride, halogen, hydrocarbyl, or halohydrocarbyl substituents, and L and L' are the same or different substituted cyclopentadienyl or indenyl ligands, in combination with an appropriate cocatalyst. Exemplary preferred transition metals include Titanium, Hafnium, Vanadium, and the present best mode, Zirconium. An exemplary Group 3 metal is Yttrium, a Lanthanide is Samarium, and an Actinide is Thorium.

The transition metal substituents X and X' may be the same or different hydride, halogen, hydrocarbyl, or halohydrocarbyl substituents, X and X' are preferably halogen, alkoxide, or $C_1$ to $C_7$ hydrocarbyl.

The ligands L and L' may be any mononuclear or polynuclear hydrocarbyl or silahydrocarbyl, typically a substituted cyclopentadienyl ring. Preferably L and L' have the formula:

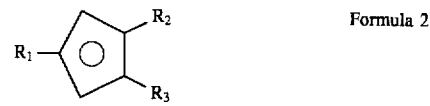

Formula 2 where $R_1$, $R_2$, and $R_3$ may be the same or different alkyl, alkylsilyl, or aryl substituents of 1 to 20 carbon atoms. Most preferably, $R_1$ is an aryl group, such as a substituted phenyl, biphenyl, or naphthyl group, and $R_2$ and $R_3$ are connected as part of a ring of 3 or more carbon atoms.

Especially preferred for L or L' of Formula 1 is a 2-arylindene of formula:

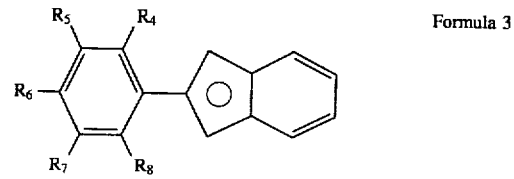

Formula 3

Where $R_4$, $R_5$, $R_6$, $R_7$, and $R_8$ may be the same or different hydrogen, halogen, aryl, hydrocarbyl, silahydrocarbyl, or halohydrocarbyl substituents. That is, $R_1$ of Formula 2 is $R_4$–$R_8$-substituted benzene, and $R_2$, $R_3$ are cyclized in a 6-C ring to form the indene moiety. Particularly preferred 2-aryl indenes include as present best mode compounds: 2-phenylindene, 2-(3,5-dimethylphenyl)indene, 2-(3,5-bis-trifluoromethylphenyl)indene, 2-(4,-fluorophenyl)indene,2-(2,3,4,5-tetrafluorophenyl)indene, 2-(1-naphthyl)indene, 2-(2-naphthyl)indene, 2-[(4-phenyl)phenyl]indene, and 2-[(3-phenyl)phenyl]indene.

Preferred metallocenes according to the present invention include: bis [2-phenylindenyl] zirconium dichloride; bis [2-phenylindenyl] zirconocene dimethyl; bis[2-(3,5-dimethylphenyl) indenyl] zirconocene dichloride; bis [2-(3,5-bis-trifluoromethylphenyl)indenyl] zirconocene dichloride; bis [2-( 4-fluorophenyl)indenyl] zirconocene dichloride; bis [2(2-(2,3,4,5-tetrafluorophenyl)indenyl] zirconocene dichloride; bis[2-(1-naphthyl)indenyl] zirconocene dichloride; [2-(2-naphthyl)indenyl] zirconocene dichloride; bis[2-[(4-phenyl)phenyl]indenyl] zirconocene dichloride; bis[2-[(3phenyl)phenyl]indenyl]zirconocene dichloride; and the same Hafnium (hafnocene) compounds such as: bis[2-phenyl(indenyl)hafnocene dichloride; bis[2-phenyl(indenyl)] hafnocene dimethyl; bis[2-(3,5-dimethylphenyl)indenyl] hafnocene dichloride; bis[2-(3,5-bis-trifluoromethyphenyl)indenyl] hafnocene dichloride; bis[2-(4,-fluorophenyl)indenyl]hafnocene dichloride; bis[2-(2,3,4,5-tetrafluorophenyl)indenyl]hafnocenedichloride;bis[2-(1-naphthyl)indenyl] hafnocene dichloride; bis[2-(2-naphthyl)indenyl] hafnocene dichloride; bis[2-[(4-phenyl)phenyl]indenyl] hafnocene dichloride; and bis[2-[(3-phenyl)phenyl]indenyl] hafnocene dichloride.

FIG. 1 shows the structure of a preferred catalyst bis-(2-phenylindenyl) zirconene dichloride. As shown in the figure, this complex crystallizes in two conformations, a racemic-like conformation 1a and a meso-like conformation 1b.

The Examples disclose a method for preparing the metallocenes in high yield. Generally, the preparation of the metallocenes consists of forming the cyclopentadienyl or indenyl ligand followed by metallation with the metal tetrahalide to form the complex.

Appropriate cocatalysts include alkylaluminum compounds, methylaluminoxane, or modified methylaluminoxanes of the type described in the following references: U.S. Pat. No. 4,542,199 to Kaminsky, et al,; Ewen, *J. Am. Chem. Soc.*, 106 (1984), p. 6355; Ewen, et al., *J. Am. Chem. Soc.* 109 (1987) p. 6544; Ewen, et al,. *J. Am. Chem. Soc.* 110 (1988), p. 6255.; Kaminsky, et al., *Angew. Chem., Int. Ed. Eng.* 24 (1985), p. 507. Other cocatalysts which may be used include Lewis or protic acids, which generate cationic metallocenes with compatible non-coordinating anions such as $B(C_6F_5)_3$ or $[PhNMe_2H]^+B(C_6F_5)^-_4$ in the presence or absence of alkylaluminum compounds. Catalyst systems employing a cationic Group 4 metallocene and compatible non-coordinating anions are described in European Patent Applications 277,003 and 277,004 filed on 27.01.88 by Turner, et al.; European Patent Application 427,697-A2 filed on 09.10.90 by Ewen, et al.; Marks, et al., *J. Am. Chem. Soc.*, 113 (1991), p. 3623; Chien et al., *J. Am. Chem. Soc.*, 113 (1991), p. 8570; Bochman et al., *Angew. Chem. Intl. Ed. Engl.* 7 (1990), p. 780; and Teuben et al., *Organometallics*, 11 (1992), P. 362, and references therein.

The catalysts of the present invention consist of non-rigid metallocenes which can change their geometry on a time scale that is between that of a single monomer insertion and the average time of growth of a polymer chain. This is provided by a non-rigid metallocene catalyst comprising of cyclopentadienyl ligands substituted in such a way that they can alternate in structure between racemic-like and meso-like geometries. Stated another way, due to the substituents at the 1, 2 and 4 positions, rotation around the L-M and L'-M bond axes is controlled so that the metallocene remains in respective rac-like and meso-like "geometries" for a time period longer than that required for monomer insertion but shorter than that required for average time for growth of the polymer chain, which geometries may be more accurately understood as "states." This is achieved in the present invention by utilizing unbridged cyclopentadienyl ligands with a 1,2,4,-substitution pattern on the cyclopentadienyl moiety. This substitution pattern insures that the ligand is achiral and will not result in diastereomers upon complexation with the metal, thus avoiding unwieldy separation of isomeric metallocenes. In addition, this substitution pattern provides catalysts which can isomerize between a meso-like and racemic-like geometry. By this we mean, when L=L' the metallocene isomerizes (alternates) between chiral rac-like and achiral meso-like states, and when L≠L' said metallocene isomerizes (alternates) between a chiral rac-like state and a state which is chiral by virtue of the difference in substituents on the ligands, but meso-like in relative orientation of the two ligands including their substituents.

In one of many embodiments, these catalyst systems can be placed on a suitable support such as silica, alumina, or other metal oxides, $MgCl_2$, or other supports. These catalysts can be used in the solution phase, in slurry phase, in the gas phase, or in bulk monomer. Appropriate solvents for solution polymerization include aliphatic or aromatic solvents such as toluene, benzene, hexane, heptane, or other suitable solvents.

The metallocenes of the present invention, in the presence of appropriate cocatalysts, are useful for the polymerization of ethylene and alpha-olefins, such as propylene, 1-butene, 1-pentene, 4-methyl-1-pentene, 1-hexene and combinations thereof. The polymerization of olefins is carried out by contacting the olefin with the catalyst systems comprising the transition metal component and in the presence of an appropriate cocatalyst, such as an alumoxane, or a Lewis acid such as $B(C_6F_5)_3$, or a protic acid containing a non-coordinating anion, such as $[PhNMe_2H]^+B(C_6F_5)_4^-$. The catalysts are far more active than the Chien catalysts for the polymerization of ethylene and alpha olefins with productivities of $3 \times 10^6$ g polymer/mol Zr.hr for propylene, and $2 \times 10^7$ g polymer/mol Zr.hr for ethylene being readily obtained.

The metallocene catalyst systems of the present invention are particularly useful for the polymerization of propylene to produce polypropylenes with novel elastomeric properties. By elastomeric, we mean a material which tends to regain its shape upon extension, or one which exhibits a positive power of recovery at 100%, 200% and 300% elongation. The properties of elastomers are characterized by several variables. The initial modulus ($M_i$) is the resistance to elongation at the onset of stretching. This quantity is simply the slope at the beginning of the stress-strain curve. Upon overstretching, the polymer sample eventually ruptures. The rupture point yields two important measurements, the tensile strength ($T_b$) and the ultimate elongation ($E_b$). These values are the stress and percent elongation at the break, respectively. The tensile set (TS) is the elongation remaining in a polymer sample after it is stretched to 300% elongation and allowed to recover. An additional measure of the reversibility of stretching is the percent recovery (PR), which is given by the equation: $100(L_{max}-L_{relax})/(L_{max}-L_{init})$.

It is believed that the elastomeric properties of the polypropylenes of this invention are due to an alternating block structure comprising of isotactic and atactic stereosequences. Without being bound by theory, it is believed that isotactic block stereosequences provide crystalline blocks which can act as physical crosslinks in the polymer network.

The structure of the polymer can be described in terms of the isotactic pentad content [mmmm] which is the percentage of isotactic stereosequences of 5 contiguous stereocenters, as determined by $^{13}C$ NMR spectroscopy (Zambelli, Locatello et al. 1975 [Ref. 5]). The isotactic pentad content of statistically atactic polypropylene is approximately 6.25%, while that of highly isotactic polypropylene can approach 100%.

While it is possible to produce polypropylenes with a range of isotactic pentad contents, the elastomeric properties of the polymer will depend on the distribution of isotactic (crystalline) and atactic (amorphous) stereosequences. Thermoplastic elastomers consist of amorphous-crystalline block polymers, and thus the blockiness of the polymer determines whether it will be elastomeric.

The blockiness of the polymer can be described in terms of the fraction of isotactic stereosequences of four or more stereocenters, (Randall 1976 [Ref. 6]) which we will denote as the isotactic Block Index, <BI>. The isotactic Block Index can be determined directly from the pentad distribution and is given by (Randall 1976 [Ref. 6]) as:

<BI>=4+2[mmmm]/[mmmr].

The isotactic Block Index for purely atactic polypropylene is <BI>=5, while that for highly isotactic polypropylene can approach <BI>=104 (Collette, Ovenall et al 1989 Ref. 7]).

We have discovered that the structure, and therefore the properties of the polypropylenes obtained with the catalysts of the present invention are dependent on the olefin concentration, the temperature of the polymerization, the nature of the transition metal, the ligands on the metallocene, and the nature of the cocatalyst. For a given propylene pressure in the reactor, the isotactic pentad content [mmmm] and the Block Index, <BI>, of the resulting polypropylene increase with decreasing polymerization temperature. Likewise the productivity and average molecular weight are inversely proportional to temperature, increasing as the reaction temperature drops.

The structure, and therefore the properties of the obtained polypropylenes also depends on the propylene pressure during the polymerization reaction. The isotactic pentad content [mmmm]and the isotactic Block Index, <BI>, of the polypropylenes increase with increasing propylene pressure. The productivity and average molecular weight of the polypropylenes also increase with increasing propylene pressure.

The structure, and therefore the properties of the obtained polypropylenes also depend on the nature of the ligands bound to the transition metal. For example, catalysts derived from bis[2-(3,5-bis-trifluoromethylphenyl)indenyl] zirconium dichloride metallocene yielded polypropylene with isotactic pentad contents up to [mmmm]=61% and an isotactic Block Index <BI>=15.3.

It will be appreciated from the illustrative examples that this catalyst system provides an extraordinary broad range of polymer properties from the polymerization process of this invention. Isotactic pentad contents from [mmmm]=61.0% to [mmmm]=6.1% can be readily obtained by suitable manipulation of the metallocene catalyst, the reaction conditions, or the cocatalyst to give polymers which range in properties from gum elastomers to thermoplastic elastomers to flexible thermoplastics, and indeed, to relatively rigid thermoplastics.

This invention also provides a novel process for tailoring the block size distribution as reflected in the isotactic pentad content [mmmm] and properties of the polymer such as melting point, tensile set and tensile strength by varying the structure of the catalyst and the conditions of the polymerization reaction. The invention provides a process whereby the isotactic pentad content and the properties of the polymer can be tailored through changes in the pressure of monomer, the temperature of polymerization, the nature of the transition metal, the nature of the ligands and the nature of the cocatalyst.

Without being bound by theory, it is believed that it is critical for the present invention to have a catalyst which can isomerize on a time scale that is slower than the rate of olefin insertion but faster than the average time to construct a single polymer chain in order to obtain a block structure. In addition, to produce elastomeric polymers, the catalyst complex isomerizes between a chiral racemic-like and an achiral mesolike geometry. This is provided in the present invention by metallocene catalysts comprising of unbridged cyclopentadienyl-based ligands which are substituted in such a way that they can exist in racemic or meso-like geometries.

Based on the evidence to date, it appears that the rotation of the cyclopentadienyl ligands provides a mechanism for the alternation of catalyst geometry. The average block size distribution for a polymer produced with a catalyst which can change its state is controlled by the relative rate of polymerization versus catalyst isomerization. The catalysts of this invention provide a means of producing polypropylenes and other alpha olefins with a wide range of isotactic and atactic block lengths by changing the substituents on the cyclopentadienyl ligands of the metallocene. It is believed that the introduction of larger substituents on the cyclopentadienyl ligands slow the rate of rotation and thereby increase the block lengths of the polymer.

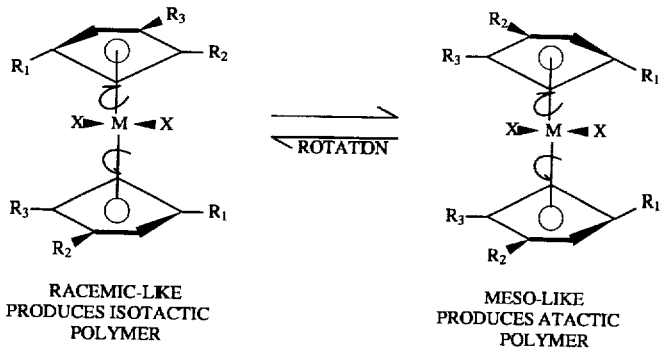

RACEMIC-LIKE
PRODUCES ISOTACTIC
POLYMER

MESO-LIKE
PRODUCES ATACTIC
POLYMER

The increase in isotactic pentad content [mmmm] and Block Index <BI> with propylene pressure appears due to an increase in the relative rate of polymerization relative to catalyst isomerization. It is further believed that the increase of isotactic pentad content [mmmm] and Block Index <BI> as the temperature of polymerization is decreased is also a result of increasing the relative rate of polymerization relative to isomerization with decreasing temperature, as would be expected for competing bimolecular (olefin insertion) versus unimolecular (catalyst isomerization) reactions. Thus, the present invention provides a rational method of control of the length of isotactic blocks, and therefore the melting points, tensile strengths, and tensile modulus, with changes in the process conditions.

The importance of freely rotating ligands is demonstrated by the polymerization of propylene with the bridged racemic and meso isomers of ethylene-1,2-bis-(2-phenyl-1-indenyl) zirconium dichloride, (Catalyst G, H). Polymerization of propylene with the rac isomer, Catalyst G, yielded isotactic polypropylene. Polymerization of propylene with the rac/meso mixture yielded a blend of atactic and isotactic polypropylene rather than a block copolymer. That this mixture was a blend was demonstrated by fractionation of the atactic material with pentane. The pentane-soluble fraction was amorphous, atactic polypropylene, and the pentane-insoluble fraction was crystalline, isotactic polypropylene.

The invention also includes novel bridged catalysts of the structure:

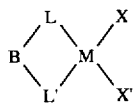

Wherein L, L', M, X, and X' are as above, and B is a structural bridge between the ligands L, L' imparting stereorigidity to the catalyst in either/both rac and meso geometries, B being preferably selected from a $C_1$–$C_4$ alkylene radical, and Ge, Si, P and In hydrocarbyl radicals.

The polymers of the present invention in one embodiment are a novel class of thermoplastic elastomers made up of propylene homopolymers of weight average molecular weights ranging from 20,000 to above about 2 million. Preferably, the average molecular weights of the polypropylenes are very high, as molecular weights on the average of 1,600,000 are readily obtainable and even higher $M_w$ are indicated. The molecular weight distributions of the polymers are quite low, with typical polydispersities, $M_w/M_n$, ranging from 1.7 to 2.5. However, by control of reaction conditions, higher molecular weight distributions also can be obtained, e.g., polydispersities of 5–20 are easily produced. The polypropylenes of the present invention have isotactic pentad contents ranging from [mmmm]=6.3%, corresponding to statistically atactic polypropylenes, to [mmmm]=61%, corresponding to an elastomeric polypropylene with high isotacticity. The polypropylenes of the present invention range from amorphous atactic polypropylenes with no melting point, to elastomeric polypropylenes of high crystallinity with melting points up to 147° C.

Accordingly, because of the wide range of structures and crystallinities, the polypropylenes of the present invention exhibit a range of properties from gum elastomers, to thermoplastic elastomers, to flexible thermoplastics. The range of elastomeric properties for the polypropylenes is quite broad. Elongations to break range from 100% to 3000%, tensile strengths range from 400 psi to 5040 psi. Tensile set at 300% elongation as low as 32% can be readily obtained, and are generally below about 70%.

The polypropylenes of the present invention exhibit low creep, particularly for samples of higher crystallinity. They can be melt spun into fibers, or can be cast into transparent, tough, self-supporting films with good elastic recoveries. Thin films of elastomeric polypropylenes with isotactic pentad contents [mmmm]=30% are slightly opaque, but exhibit stress-whitening upon extension, which may be indicative of stress-induced crystallization. Upon isolation of an elastomeric polypropylene of this invention from solution under vacuum, the polymer was observed to make a closed-cell foam, with a spongy texture. The elastomeric polypropylenes can also be cast into molded articles.

Samples of lower crystallinity were observed to adhere quite well to glass.

The elastomeric polymers of the present invention form excellent adhesives. They adhere well to glass, paper, metals and other materials. A sample of lower crystallinity was observed to adhere well to paper, allowing a manila file folder to be attached to and supported on a metal filing cabinet. Upon removal of the material, the sample remained adhered to the paper and no residue was left on the metal surface.

The polypropylenes of the present invention can be blended with isotactic polypropylenes. The melting points and heats of fusion of the blends increase steadily with increasing mole fraction of isotactic polypropylene in the blend.

The utility of the polymers of the present invention are evident and quite broad, including films, adhesives, resilient and elastomeric objects. As they are completely compatible with isotactic polypropylene, they are ideal candidate additives to improve the toughness and impact strength of isotactic polypropylenes.

DETAILED DESCRIPTION OF THE BEST MODE OF THE INVENTION:

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

I. Metallocene Catalyst Preparation

EXAMPLE 1 - Preparation of 2-Phenylindene, (Ligand 1)

A solution of 2-indanone (13.47 g, 102 mmol) in anhydrous benzene (100 mL) is added to phenylmagnesium bromide (3.0M in diethyl ether, 50.9 mL, 153 mmol) at 5° C. over 2.5 hours. The reaction was allowed to warm to room temperature over 30 minutes. The solution was cooled to 0° C. and 150 mL of water are added. The resultant mixture was diluted with 200 mL of hexanes, neutralized with 5M HCl, and washed with brine (2×100 mL). The aqueous layer was extracted with hexanes (2×50 mL), and the combined organic layers were dried (MgSO$_4$), filtered, and the solvent removed in vacuo from the filtrate to yield a brown oil. This oil and p-toluenesulfonic acid (0.50 g) were dissolved in benzene (250 mL) in a round-bottom flask below a Soxhlet extractor containing 4 Å molecular sieves. After refluxing for 2.5 hours, the solution was filtered and cooled to 5° C. overnight. The product, a white flaky solid, was collected by filtration, and was washed with 50 mL of cold benzene. Additional product is obtained by concentrating the filtrate, cooling, and filtering the crystals (12.60 g, 64.3% yield). 1H NMR (400 Mhz, 20° C., CDCl$_3$) δ7.62 (d,J=7.3 Hz, 2H), 7.47 (d,J =7.3 Hz, 1H), 7.39 (m, 3H), 7.27 (m, 2H), 7.22 (s,1H), 7.18 (t,J=7.4 Hz,1H), 3.78 (S, 2H). $^{13}$C{$^1$H} NMR (100 Mhz, 20° C., CDCl$_3$): δ146.3, 145.3, 143.1, 135.9, 128.6, 127.5, 126.5, 126.4, 125.6, 124.7, 123.6, 120.9, 38.9.

EXAMPLE 2 - Preparation of Bis (2-phenylindenyl) zirconium dichloride, Catalyst A (Ligand 1)

A solution of n-butyllithium (1.6M in hexanes, 3.25 mL, 5.2 mmol) was added to a solution of 2-phenylindene (1.01 g, 5.3 mmol) in tetrahydrofuran (40 mL) at −78° C. over 2 minutes. The orange solution was warmed to room temperature over 30 minutes. After solvent is removed in vacuo, the yellow solid was suspended in toluene (25 mL). To this mixture was added a suspension of $ZrCl_4$ (612 mg, 2.6 mmol) in toluene (25 mL) at room temperature. This yellow solution is stirred for 2.5 h, heated to 80° C., and filtered over a medium frit packed with Celite. The Solution was cooled to −20° C. overnight, resulting in the formation of yellow-orange rod-like crystals of bis (2-phenylindenyl) zirconium dichloride (1.173 g, 82.0% yield). $^1H$ NMR (400 Mhz, 20° C., $C_6D_6$): δ7.38 (d, J =7.1 Hz, 4H), 7.17 (m, 4H), 7.10 (m, 2H), 7.04 (dd, J=6.5, 3.1 Hz, 4H), 6.90 (dd, J=6.5, 3.1 Hz. 4H), 6.41 (s, 4H). $^{13}C\{^1H\}$ NMR (100 MHz, 20° C., $C_6D_6$) δ133.6, 132.7, 128.9, 128.5, 127.2, 126.9, 126.7, 125.1, 103.6. X-Ray Crystal Structure: See FIG. 1.

EXAMPLE 3 - Preparation of Bis(2-phenylindenyl)zirconium dimethyl, Catalyst B (Ligand 1)

A solution of methyllithium (1.4 in diethyl ether, 0.75 mL, 1.05 mmol) was added to a solution of bis(2-phenylindenyl)zirconium dichloride (280 mg, 0.51 mmol) in diethyl either (100 mL) at −100° C. The bright yellow solution is warmed to room temperature over 30 minutes. After 3 hours, volatiles are removed from the colorless solution and toluene is added (25 mL). The solution was filtered over a medium frit packed with Celite, and solvent is removed in vacuo. Crystallization from toluene (1 mL) and pentane (15 mL) yields cream colored cubes (110 mg, 42.5%). $^1H$ NMR (400 Mhz, 20° C., $C_6D_6$): δ7.28 (m,4H), 7.16 (m, 6H), 702 (dd, J=6.4, 3.2 Hz, 4H), 6,93 (dd, J=6.5, 3.2 Hz, 4H), 6.00 (s, 4H), −0.85 (s, 6H).

EXAMPLE 4 - Preparation of Bis(2-phenylindenyl) hafnium dichloride, Catalyst C (Ligand 1)

A solution of n-butyllithium (2.5M in hexanes, 2.45 mL, 61 mmol) was added to a solution of 2-phenylindene (1.18 g, 61 mmol) in tetrahydrofuran (40 mL) at −78° C. over 2 minutes. The orange solution was warmed to room temperature over 30 minutes. After solvent is removed in vacuo, the orange oil was suspended in toluene (65 mL). To this mixture was added a suspension of $HfCl_4$ (99.99% Hf, 980 mg, 3.1 mmol) in toluene (5 mL) at room temperature. This rust colored solution was stirred in the dark for 3 hours and filtered over a medium frit packed with Celite. Solvent is removed to yield a dark orange solid. A 100 mg sample is freed from unreacted ligand by sublimation at 120° C. Recrystallization from toluene at −20° C. overnight yields a dark yellow solid (28 mg, 28% yield). $^1H$ NMR (400 Mhz 20° C $C_6D_6$): δ7.36 (d, J=7.2 Hz, 4H), 7.18 (m, 4H), 7.12 (m, 2H), 7.07 (dd. J=6.6, 3.1 Hz, 4H), 6.88 (dd, J=6,6, 3.1 Hz, 4H), 6.29 (s, 4H). $^{13}C\{^1H\}$ NMR (100Mhz) 20° C., $C_6D_6$): δ132.7, 132.1, 128.8, 128.5, 127.2, 126.1, 125.1, 101.4.

EXAMPLE 5 - Preparation of 2-(Bis-3,5-trifluoromethylphenyl)indene, Ligand 2

A 3-neck 500-mL round-bottomed flask fitted with a condenser and an addition funnel was charged with 2.62 g (0.11 mol) of Mg turnings and 20 mL of anhydrous $Et_2O$. Slow addition of a solution of 25.10 g (0.09 mol) of 3,5-bis(trifluoromethyl)bromobenzene in $Et_2O$ (100mL), followed by refluxing for 30 min, gave a brown-grey solution of the aryl Grignard reagent. The solution was cooled to room temperature, filtered over a plug of Celite and evacuated to yield a brown oil. Toluene (40 mL) was added and the suspension cooled to 0° C. whereupon a solution of 2-indanone (9.22 g, 0.07 mol) in toluene (60 mL) was added dropwise to give a tan-brown slurry. This mixture was warmed to room temperature and stirred for an additional 3 hours. After cooling to a 0° C. it was quenched with 150 mL of water. Hexane (200 mL) was added and the reaction mixture neutralized with 5M HCl. The organic layer was separated, and the aqueous layer was extracted with two 50-ml portions of hexane. The combined organic layers were washed with two 50-ml portions of brine and dried over anhydrous magnesium sulfate. After filtration over Celite, the solvent was removed under vacuo yielding 21.5 g (89% based on 2-indanone) of 2-(bis-3,5-(trifluoromethyl)phenyl)indanol as an off-white solid. $^1H$ NMR (CDCl$_3$, 23° C., 400 Mhz): δ8.05 (s, 2H), 7.80 (s, 1H), 7.5-7.0 (m, 4H), 3.41 (m, 4H), 2.21 (s, 1H, OH). Under argon, this alcohol (21.5 g, 0.06 mol) and p-toluenesulfonic acid monohydrate (800 mg) were dissolved in toluene (250 Ml) and the solution was heated to reflux for 6 hours to afford 14.4 g, (70%) of 2-(bis-3,5-(trifluoromethyl)phenyl)indene upon recrystallization from diethyl ether/hexane at −18° C. $^1H$ NMR (CDCl$_3$, 23° C., 400 Mhz): δ8.01 (s, 2H), Ar$_f$), 7.75 (s, 1H, Ar$_f$), 7.52 (d, J=7 Hz, 1H), 7.47 (d, J=7 Hz, 1H), 7.43 (s, 1H), 7.33 (dd, 2J=7 Hz, 1H), 7.27 (dd, 2J=7 Hz, 1H), 2.83 (s, 2H). $^{13}C$ NMR (CDCl$_3$, 23° C., 100 Mhz): δ144.3 (s), 143.1 (s), 143.1 (s), 138.0 (s),132.1 (q, $^2J_{C-F}$=33 Hz), 130.1 (d, $J_{C-H}$= 167 Hz), 127.0 (dd), $J_{C-H}$=160 Hz, $^2J_{C-H}$=7 Hz),126.0 (dd, $J_{C-H}$=159 Hz, $^2J_{C-H}$=7 Hz)m 125.2 (brd, $J_{C-H}$=162 Hz), 123.9 (dd, $J_{C-H}$=156 Hz, $^2J_{C-H}$=9 Hz), 123.4 (q. $J_{C-G}$=273 Hz, CF$_3$), 121.8 (dd, $J_{C-H}$=160 Hz, $^2J_{C-H}$=8Hz), 120.6 (brd, $J_{C-H}$=167 Hz), 38.9 (td, $J_{C-H}$=127 Hz, $^2J^{C-H}$=7 Hz, CH$_2$). C,H analysis: Anal. Found (Calcd): C, 62.45 (62.20); H 3.01 (3.07).

EXAMPLE 6 - Preparation of Bis (2(Bis-3,5-trifluoromethylphenyl)indenyl) zirconium dichloride, Catalyst D (Ligand 2)

N-Butyllithium (2.5M in hexanes, 850 mL, 2.13 mmol) was added to a solution of 2-(bis-3,5,(trifluoromethyl)phenyl)indene (648 mg, 1.97 mmol) in toluene (15 mL). The heterogeneous solution was stirred at ambient temperature for 4 hours 30 minutes to give a green-yellow solution which was treated with a suspension of $ZrCl_4$ (240 mg, 1.03 mmol) in toluene (20 mL) via cannula. The yellow suspension was stirred at ambient temperature for 2 hours 30 minutes, heated to ca. 80° C., and filtered over a plug of Celite. After washing the Celite with hot toluene several times (3×10 mL) , the filtrate was concentrated and cooled to −18° C. to give 442 mg (55%) of light yellow crystals of Bis (2- (Bis-3,5-trifluoromethylphenyl)indenyl)zirconium dichloride, catalyst D. $^1H$ NMR ($C_6D_6$, 23° C., 400 Mhz): δ7.67 (s, 2H, ar$_f$), 7.55 (s, 4H, Ar$_f$), 7.19 (m, 4H, Ar), 6.89 (m,4H, Ar), 5.96 (s, 4H, Cp-H). $^{13}C$ NMR ($C_6D_6$, 23° C., 100 Mhz): δ135.6 (s), 133.1 (s), 131.6 (q, $^2J_{C-F}$=33 Hz), 127.1 (brd, $J_{C-H}$=161 Hz), 126.8 (s), 126.4 (dd, $J_{C-H}$=161 Hz, $^2J_{C-H}$=8 Hz), 125.4 (dd, $J_{C-H}$=167 Hz), $^2J_{C-H}$=5 Hz), 123.8 (q, $J_{C-F}$=273 Hz, CF$_3$), 121.8 (brd, JC-H=159 Hz) , 102.5 (dd, $J_{C-H}$=176 Hz, $^2J_{C-H}$=7 Hz, Cp (C-H). C,H analysis: Anal. Found (Calcd.): C, 49.99 (50.01); H 2.32 (2.22).

EXAMPLE 7 - Preparation of Bis (2-(Bis-3,5-trifluoromethylphenyl) indenyl) hafnium dichloride, Catalyst E (Ligand 2)

N-Butyllithium (1.6M in hexanes, 3.7 Ml, 5.92 mmol) was added to a solution of 2-(bis-3,5-(Trifluoromethyl)phenyl)indene (1.76 g, 5.36 mmol) in toluene (40 mL). The heterogeneous solution was stirred at ambient temperature for 4 hours 30 minutes to give a green-yellow solution which was treated with a suspension of $HfCl_4$ (897 mg, 2.80 mmol) in toluene (45 mL) via cannula. The yellow suspension was stirred at ambient temperature for 22 h, heated to ca. 80° C., and filtered over a plug of Celite. After washing the Celite with hot toluene several times (3×20 mL), the filtrate was concentrated and cooled to −18° C. to give 455 mg (19%) of light yellow crystals of Bis (2-(Bis-3,5-trifluoromethylphenyl)indenyl)hafnium dichloride, Catalyst E. $^1H$ NMR ($C_6D_6$, 23° C., 200 Mhz); d 7.65 (s, 2H, $Ar_f$), 7.51 (s, 4H, $Ar_f$), 6.7–7.3 (m, 8H Ar), 5.63 (s, 4H, Cp-H). $^{13}C$ NMR ($C_6D_6$ 23° C., 100 Mhz): δ135.8 )s), 132.9 (s) , 131.6 (q, $^2J_{C-F}$=34 Hz), 127.2 (brd, $J_{C-H}$=160 Hz), 126.3 (dd, $J_{C-H}$= 161 Hz, $^2J_{C-H}$=8 Hz), 126.0 (s), 125.6 (dd, $J_{C-H}$=167 Hz, $^2J_{C-H}$=5 Hz), 123.8 (q, $J_{C-F}$=273 Hz, $CF_3$), 121.7 (brd, $J_{C-H}$=161 Hz) , 100.1 (dd $J_{C-H}$=176 Hz, $^2J_{C-H}$=6 Hz Cp C-H).

EXAMPLE 8 - Preparation of 2-(4-tert-butylphenyl)indene, (Ligand 3)

A 3-neck 250 mL round-bottomed flask fitted with a condenser and an addition funnel was charged with 1.48 g 0.06 mol) of Mg turnings and 10mL of anhydrous $Et_2O$. slow addition of a solution of 10.0 g (0.05 mol) of 4-tert-butylbromobenzene in $Et_2O$ (70 ml), followed by refluxing for 1 hour, gave a yellow solution of the aryl Grignard reagent. The solution was cooled to room temperature, filtered over a plug of Celite, and evacuated to yield a yellow foam. Toluene (15 ml) was added and the suspension cooled to 0° C. and treated dropwise with a solution of 2-indanone (4.97 g, 0.04 mol) in toluene (35 mL) to give an off-white slurry. The heterogeneous reaction mixture was warmed to room temperature and stirred for an additional 30 minutes. After cooling to 0° C. it was quenched with 74 mL of water. Hexane (75 mL) was added and the reaction mixure was neutralized with 5M HCl. The organic layer was separated, and; the aqueous layer was extracted with two 15-mL portions of hexane. The combined organic layers were washed with two 30-mL portions of brine and dried over anhydrous magnesium sulfate. After filtration over Celite, the solvent was removed under vacuo yielding a yellow oily solid. The solid was triturated with small portions of hexane to give 4.65 g (46% based on 2-indanone) of 2-(4-'butylphenyl)indanol as a white solid. $^1H$ NMR ($CDCl_3$, 23° C., 400Mhz): δ7.6–7.0 (m, 8H) , 3.40 (m, 4H) , 2.16 (s, 1H, OH), 1.25 (s, 9H 'Bu).

Under argon, this alcohol (4.3 g, 0.06 mol) and p-toluenesulfonic acid monohydrate (120 mg) were dissolved in benzene (74 mL) and the solution was heated to reflux for 2 hours 30 minutes to give 2-(4-t-butylphenyl)indene, which was recrystallized from diethyl ether/hexane at −18° C. (2.74 g, 68%). $^1$ NMR ($CDCl_3$, 23° C., 400 MHz): δ7.59 (d, J=8.5 Hz, 2H), 7.47 (d, J=7 Hz, 1H), 7.42 (d, J=8.5 Hz, 2H), 7.40 (d, J=7 Hz, 1H), 7.28 (dd, 2J=7 Hz, 1H), 7.20 (s, 1H), 7.18 (dd, 2J=7 Hz), 1H, 3.79 (s, 2H), 1.36 (s, 9H, 'Bu). $^{13}C$ NMR ($CDCl_3$, 23° C., 100 Mhz): δ150.7 (s), 146.4 (s), 145.6 (s), 143.1 (s), 126.6 (dd, $J_{C-H}$=159 Hz, $^2J_{C-H}$=7 Hz), 125.8 (d, $J_{C-H}$=163 Hz), 125.6 (dd, $J_{C-H}$=157 Hz, $^2J_{C-H}$=7 Hz) 125.4 (dd, $J_{C-H}$=7 Hz), 124.5 (dd, $J_{C-H}$=159 Hz, $^2J_{C-H}$=7 Hz), 123.6 (dd, $J_{C-H}$=158 Hz, $^2J_{C-H}$=8 Hz), 120.8 (dd, $J_{C-H}$=159 Hz, $^2J_{C-H}$=8 Hz), 39.0 (td, $J_{C-H}$=128 Hz, $^2JC-H$=6 Hz, $CH_2$), 34.6 (s, $C(CH_3)_3$), 31.3. (brq, $J_{C-H}$=126 Hz, $C(CH_3)_3$). Anal. found (calcd.): C, 91.40(91.88); H, 7.98 (8.12).

EXAMPLE 9 - Preparation of Bis (2-(4-tert-butylphenyl)indenyl)zirconium dichloride, Catalyst F (Ligand 3)

N-Butyllithium (1.6M in hexanes, 1.8 4 mL, 2.88 mmol) was added to a solution of 2-(4-'butylphenyl)indene (710 mg, 2.86 mmol) in tetrahydrofuran (15 mL) at −78° C. The orange solution was warmed to ambient temperature and stirred for 30 minutes. The solvent was then removed in vacuo to give a yellow solid. The Schlenk flask was cooled to −78° C. and 15 mL of toluene were added. Then, a suspension of $ZrCl_4$ (333 mg, 1.43 mmol) in toluene (15 mL was added via cannula. The solution was warmed to room temperature and stirred for f1.5 hours to give a black-red solution, which was filtered over a plug of Celite. After washing the Celite with toluene several times (3×10 mL), the filtrate was concentrated and cooled to −18° C. to give 267 mg (28% of Bis (2-(4-tertbutylphenyl)indenyl)zirconium dichloride as orange crystals. $^1H$ NMR for F ($C_6D_6$, 23° C., 400 Mhz): δAB pattern centered at 7.42 ppm and integrating for 4H, AB pattern centered at 6.96 ppm and integrating for 4H, 6,56 (s, 2H, Cp-H), 1.30 (s, 9H, 'Bu). $^{13}C\{H\}$ NMR ($C_6D_6$, 23° C., 100 Mhz): δ151.7 (s), 132.6 (s), 130.9 (s), 127.2 (s, Ar C-H), 126.8 (s), 126.9 (s), 126.6 (s, Ar C-H), 125.9 (s, Ar C-H), 125.1 (s, Ar C-H), 103.5 (s, Cp C-H), 34.7 (s, $C(CH_3)_3$), 31.4 (2, $C(CH_3)_3$).

EXAMPLE 10 - Preparation of Ethylene-1,2-bis(2-phenyl-1-indene)

N-Butyllithium (1.6M in hexanes, 10.1 mL, 16.2 mmol) is added to a solution of 2-phenylindene (3.083 g, 16.0 mmol) in tetrahydrofuran (120 mL) at −78° C. over 20 minutes. The dark orange solution is warmed to room temperature and is stirred for 20 minutes. The solution is recooled to −78° C., and 1,2-dibromoethane (0.70 mL, 1.53 g, 8.1 mmol) is added over 5 minutes. The solution is immediately warmed to 40° C. and is stirred overnight. The reaction is quenched by bubbling HCl gas through the solution for 30 seconds. After removing solvent in vacuo, the solid is extracted with 120 mL of methylene chloride, filtered over Celite, and dried in vacuo. This intermediate product consists predominantly of unreacted 2-phenyl-1-indene, 2-phenyl-1-spirocyclopropylindene, and a small amount of the desired ethylene-bridged ligand. The solid and NaH (332 mg, 13.8 mmol) are placed a 100 mL Schlenk tube under argon. 2-Methoxyethyl ether (50 mL) is added, and the green solution is refluxed at 160° C. and 18-crown-6 (770 mg, 2.9 mmol) is added. The reaction is refluxed at 160° C. for 4 hours, cooled to room temperature, and deionized water (30 mL) is added. The cream colored precipitate is collected by filtration, dissolved in tetrahydrofuran, dried over $MgSO_4$, and dried in vacuo. Unreacted 2-phenylindene and 2-phenyl-1-spirocyclopropylindene is removed from the product by sublimation at 130° C. The remaining orange solid is recrystallized from tetrahydrofuran (≈5 mL) to give an orange solid (1.75 g, 52.5%).

EXAMPLE 11 - Preparation of rac/meso-Ethylene-1,2-bis(2-phenyl-1-indenyl)zirconium dichloride, Catalyst G, H (Ligand 4)

N-Butyllithium (2.5M in hexanes, 2.10 mL, 5.3 mmol) is added to a solution of ethylene-1,2-bis(2-phenyl-1-indene)

(1.061 g, 2.6 mmol) in toluene (35 mL) at 0° C. over 2 min. The solution is warmed to 80° C. and is stirred for 1 hour. The solution becomes cloudy, and is allowed to cool to room temperature over 30 minutes. To this mixture is added a suspension of $ZrCl_4$ (612 mg. 2.6mmol) in toluene (35 mL). This mixture is stirred at 50° C. for 1 hour, then at room temperature for 18 hours, and filtered over a medium frit packed with Celite. Solvent is removed in vacuo, and the remaining orange solid is recrystallized at −20° C. from a mixture of diethyl ether (18 mL) and tetrahydrofuran (2 mL) in a Schlenk tube containing a vial of pentane (12 mL). The racemic and meso-isomers of ethylene-1,2-bis (2-phenyl-1-indenyl) zirconium dichloride were obtained as two types of crystals, orange cubes and yellow plates. A small sample (1.8 mg) of the orange cubes were manually separated from the mixture in air and were characterized by $^1H$ NMR as the racemic isomer G (400 MHz, 20° C., $C_6D_6$): δ7.75 (d, J=8.2 hz, 4H), 721 (m, 4H), 7.07 (m, 2H), 6,82 (s, 2H), 6.66 (m, 2H) 6.21 (d, J=8.8 Hz, 2H), 3.77 (d, J =8.8, 2H), 3.14 (d, J=8.8, 2H). This product was characterized as the racemic-isomer. The remaining mixture of yellow and orange crystals was also characterized by $^1H$ NMR. In addition to the rac-isomer shifts, those of the meso-isomer were present. $^1H$ NMR (400 Mhz, 20° C., $C_6D_6$): δ6 7.51 (d, 7.7 Hz, 4H), 7.1–7.2 (m, 2H), 7.07 (m, 2H), 6.86–6.94 (m, 8H), 6.73 (m, 2H), 6.61 (s, 2H), 3.4403.64 (m, 4H). The original mixure was determined to contain 56.1% of the racemic-isomer and 43.99% meso-isomer, as determined by integration of the shifts at δ 6.82 (rac-Cp-H) and 6.61 (meso-Cp-H). Characteristic ethylenebridge shifts were characterized by $^{13}C\{^1H\}$ NMR (100 MHz, 20° C., $C_6D_6$): 27.81, 26.71.

II. POLYMERIZATION

This section gives examples of polymer preparation using catalysts of this invention, and compares them to bridged catalysts. The physical testing of the polymers is set forth in Section III below. Note, two types of MAO co-catalysts were used, one type is methylalumoxane containing predominantly methyl groups as sold by Ethyl or Schering and the other, identified as AKZO type 4A, has 11.9 mole % butyl groups and 86.7% methyl groups.

EXAMPLE 12 - Typical Olefin Polymerization - Propylene and Ethylene (a) In a nitrogen filled drybox, a 80 mL Fischer-Porter bottle containing a magnetic stirring bar is charged with bis(2-phenylindenyl)zirconium dichloride (catalyst A, Ex 2) (6 mg, 11 μmol) and dry Schering-brand methylaluminoxane (713 mg, 12.3 mmol). Once removed from the drybox, toluene (20 mL) is transferred to the reactor using a stainless-steel cannula needle. After the degassing the reaction solution by freezing in a liquid nitrogen bath under vacuum, approximately 8 mL of propylene are added to the reactor at −78° C. The cooling bath is dropped, and the reaction mixture is allowed to warm to 0° C. After 10 minutes, the reaction solution becomes very viscous, and the reactor is immediately vented. The polymer is precipitated by the addition of methanol (10 mL), collected by filtration, and dried overnight at 30° C. The polymer is extracted into refluxing toluene, filtered, and dried in vacuo to yield 5.35 g of a rubbery white solid. Productivity: $2.9 \times 10^6$ gPP/molZr.h. The mmmm pentad content by $^{13}C$ NMR is 11.6%. $AM_w$ of 209,000 and $M_w/M_n$ of 3.0 is determined by GPC versus polystyrene.

(b) In a nitrogen filled drybox, a 350 mL stainless-steel autoclave equipped with a mechanical stirrer is charged with bis (2-phenyllindenyl)zirconium dichloride (3 mg, 5.5 μmol) and dry Ethyl-brand methylaluminoxane (319 mg, 5.5 mmol). Once removed from the drybox, the autoclave is evacuated at room temperature for 15 minutes, and toluene (100 mL) is drawn into the reactor through a stainless-steel cannula needle. After stirring the reaction solution for 10 minutes at 25° C., ethylene is added to the reactor at a pressure of 130 psig. After stirring for 7 minutes, temperature control becomes difficult and the reaction is quenched by injecting methanol (10 mL) at 250 psig. The autoclave is vented slowly and opened. The polymer is precipitated by the addition of methanol (150 mL), collected by filtration, and dried overnight at 30° C. Crude yield: 14.2 g. Activity: $2.2 \times 10^7$ gpp/molZr.h. A $M_w$ of 372,000 and $M_w/M_n$ of 27.5 is determined by GPC versus polyethylene standards.

EXAMPLES 13–16 - Polymer structure as a function of reaction temperature

In a nitrogen filled drybox, a 100 mL Schlenk tube containing a magnetic stirring bar was charged with bis(2phenylindenyl)zirconium dichloride (Catalyst A, Ex 2) (6 mg, 11 μmol) and dry Schering-brand methylaluminoxane (660 mg, 11mmol. Once removed from the drybox, toluene (80 mL) was transferred to the flask thermostated at the appropriate temperature using a stainless-steel cannula needle. After aging for 10 minutes at the desired temperature, the bright yellow solution was placed under partial vacuum and propylene was added to the flask at a pressure of 0.5 psig. After stirring for 15 minutes, the polymerization was quenched by the addition of methanol (20 mL). The polymer was collected by filtration, and dried overnight at 30° C. The polymer was extracted into refluxing toluene, filtered, and dried in vacuo to yield rubbery white solids in examples 14–16, and a clear tacky solid in the case of Example 13. The polypropylene of Example 16 exhibited melting points of 56° C. and 140° C. The results are summarized in Table 1.

TABLE 1

| | Propylene Polymerization at Various Temperatures[a] | | | | | | | |
|---|---|---|---|---|---|---|---|---|
| Example | Temp. (°C.) | Pressure (psig) | Time (min) | Productivity ($\times 10^5$)[b] | $M_w{}^c$ ($\times 10^3$)[c] | $M_w/M_n$ | % mmmm[d] | BI[e] |
| 13 | 45 | 0.5 | 15 | 1.9 | 24 | 2.8 | 6.3 | 5.02 |
| 14 | 25 | 0.5 | 15 | 3.1 | 67 | 2.7 | 9.2 | 5.32 |
| 15 | 0 | 0.5 | 15 | 7.1 | 183 | 2.6 | 12.3 | 5.67 |
| 16 | −25 | 0.5 | 15 | 11.0 | 330 | 2.2 | 16.1 | 6.12 |

[a]Catalyst A [Zr] = $1.0 \times 10^{-4}$M, [Al]/[Zr] = 1033.
[b]gPP/mol Zr.h.

TABLE 1-continued

| | | Propylene Polymerization at Various Temperatures[a] | | | | | | |
|---|---|---|---|---|---|---|---|---|
| Example | Temp. (°C.) | Pressure (psig) | Time (min) | Productivity (×10⁵)[b] | $M_w^c$ (×10³)[c] | $M_w/M_n$ | % mmmm[d] | BI[e] |

[c]Determined by GPC vs. polystyrene.
[d]Determined by ¹³C NMR spectroscopy.
[e]BI = isotactic block index = 4 + 2 [mmmm]/[mmmr].

EXAMPLES 17–20 Polymer Microstructures as a Function of Reaction Pressure

In a nitrogen drybox, a 300 mL stainless steel autoclave equipped with a mechanical stirrer was charged with bis(2-phenylindenyl)zirconium dichloride (catalyst A, Ex 2) (3 mg, 5.5 µmol) and dry Schering-brand methylaluminoxane (319 mg, 5.5 mmol). Once removed from the drybox, the autoclave was evacuated at room temperature for 15 minutes, and toluene (100 mL) was drawn into the reactor through a stainless-steel cannula needle. After stirring the reaction solution for 10 minutes at 0° C., propylene was added to the reactor to the appropriate pressure. After stirring for 10 minutes, the polymerization was quenched by injecting tetrahydrofuran (10 mL). The autoclave was slowly vented and opened. The polymer was precipitated by the addition of methanol (150 mL), collected by filtration, and dried overnight at 30° C. The polymer was extracted into refluxing toluene, filtered, and dried in vacuo to yield a white rubbery solid. The results were summarized in Table 2.

Once removed from the drybox, toluene (50 mL) is transferred to the reactor using a stainless-steel cannula needle. The reaction solution is placed under partial vacuum at −78° C., then is allowed to warm to 0° C. Propylene is added to the reactor at 36 psig for 15 minutes. The reactor is immediately vented, and the reaction solution is poured into methanol (150 mL). The polymer is collected by filtration and dried overnight at 30° C. Crude yield: 4.50 g. The polymer is extracted into refluxing toluene, filtered, and dried in vacuo to yield 2.20 g of a white rubbery solid. Productivity: 8.0×10⁵ gPP/molZr.h. The mmmm pentad content by ¹³C NMR is 14.1% $AM_w$ of 211,000 and $M_w/M_n$ of 2.4 is determined by GPC versus polystyrene.

TABLE 2

| | Propylene Polymerization at Various Pressures[a] | | | | | |
|---|---|---|---|---|---|---|
| Example | Pressure (psig) | Time (min) | Productivity (×10⁵)[b] | $M_w^c$ (×10³) | $M_w/M_n$ | % mmmm[d] | BI[e] |
| 17 | 5 | 10 | 2.7 | 213 | 1.5 | 11.6 | 5.58 |
| 18 | 25 | 10 | 6.2 | 395 | 1.9 | 13.2 | 5.87 |
| 19 | 50 | 10 | 10.4 | 540 | 1.7 | 15.7 | 5.93 |
| 20 | 75 | 10 | 17.3 | 604 | 1.8 | 17.4 | 6.19 |

[a]Catalyst A [Zr] = 5.5 × X 10⁻⁵M, [Al]/[Zr] = 1000.
[b]gPP/mol Zr.h.
[c]Determined by GPC vs. polystyrene.
[d]Determined by ¹³C NMR spectroscopy.
[e]BI = isotactic block index = 4 + 2 [mmmm]/[mmmr].

EXAMPLE 21

In a nitrogen filled drybox, a 80 mL Fischer-Porter bottle containing a magnetic stirring bar is charged with bis(2-phenylindenyl)zirconium dichloride (6 mg, 11 µmol) and dry Schering-brand methylaluminoxane (660 mg, 11 mmol).

TABLE 3

| | Propylene Polymerization at a Higher Catalyst Concentration[a] | | | | | | |
|---|---|---|---|---|---|---|---|
| Example | Temp. (°C.) | Pressure (psig) | Time (min) | Productivity (×10⁵)[b] | $M_w^c$ (×10³) | $M_w/M_n$ | % mmmm[d] | BI[e] |
| 21 | 0 | 36 | 15 | 8.0 | 211 | 2.4 | 14.1 | 5.94 |
| | | | | | | | | 4.1 |

[a]catalyst [Zr] = 2.2 × 10⁻⁴M, [Al]/[Zr]= 1033.
[b]gPP/mol Zr.h.
[c]Determined by GPC vs. polystyrene.
[d]Determined by ¹³C NMR spectroscopy.
[e]isotactic block index = 4 + 2 [mmmm]/[mmmr].

EXAMPLE 22 a, b Polymer Microstructure as a Function of MAO type

In a nitrogen filled drybox, a 300 mL stainless-steel autoclave equipped with a mechanical stirrer was charged with bis-(2-phenylindenyl)zirconium dichloride (3 mg, 5.5 µmol), (catalyst A, Ex 2), and methylaluminoxane (270 mg, 4.7 mmol). In one example, Example 22a dry Shering MAO was used, and in Example 22b AKZO modified MAO was used (See Table 4 below). Once removed from the drybox, the autoclave was evacuated at room temperature for 15 minutes. After filling the reactor with argon, toluene (50 mL) was drawn into the reactor through a stainless-steel cannula needle. After stirring the reaction solution for 5 minutes at 30° C., the reactor was cooled to −38° C. and propylene was added to the reactor at a pressure of 40 psig. The temperature increases to −18° C. over 1 minute, where it was stirred for two hours. The polymerization was quenched by injecting methanol (10 mL) at 250 psig. The autoclave was vented slowly and opened. The polymer was precipitated by the addition of methanol (150 mL), collected by filtration, and dried overnight at 30° C. The polymer was precipitated by the addition of methanol (150 mL), collected by filtration, and dried overnight at 30° C. The polymer was extracted into refluxing toluene, filtered, and dried in vacuo to yield a white rubbery solid. The results are summarized in Table 4.

ethylene-1,2-bis(2-phenyl-1-indenyl)zirconium dichloride (5 mg, 8.8 µmol) and dry Schering-brand methylaluminoxane (1.04 g, 17.9 mmol). Once removed from the drybox, toluene (50 mL) is transferred to the reactor using a stainless-steel cannula needle. After aging for 5 minutes at 20° C., the green solution is placed under partial vacuum and propylene is added to the reactor at a pressure of 0.5 psig. The solution turns yellow-orange after 5 minutes. After stirring for 2 hours at 20° C., the polymerization is quenched by the addition of methanol (10 mL). The crude polymer was collected by filtration, and dried overnight at 30° C. to give 7.45 g of a white solid. This solid was extracted with pentane and filtered, giving a pentane soluble (1.29 g) and insoluble (6.16 g) fraction. As this polymer can be fractionated with pentane, it is clearly a polymer blend, not a block copolymer.

The mmmm pentad content of the pentane soluble fraction, as determined by $^{13}$C NMR spectroscopy, was 6.2%, and is thus clearly atactic. A $M_w$ of 124,000 and $M_w/M_n$ of 1.7 was determined by GPC versus polystyrene. This material is an extremely interesting, high molecular weight atactic polypropylene which is rubbery and slightly tacky, with high cohesion and good adhesion to a glass surface.

Residual cocatalyst was removed from the pentane insoluble fraction by extraction with toluene to yield 4.58 g of a white powder. The mmmm pentad content of the pentane insoluble fraction, as determined by $^{13}$C NMR

TABLE 4

| | Propylene Polymerization with Various Methylaluminoxanes[a] | | | | | | |
|---|---|---|---|---|---|---|---|
| Example | MAO Type | Time (min) | Productivity (×10$^5$)[b] | $M_w$[c] (×10$^3$) | $M_w/M_n$ | % mmmm[d] | BI[e] |
| 22a | Schering | 120 | 14.0 | 1,650 | 1.86 | 17.4 | 6.38 |
| 22b | Akzo-Modified | 120 | 6.5 | 871 | 2.34 | 20.0 | 6.73 |

[a]A Catalyst, [Zr] = 1.1 × 10$^{-4}$M, [Al]/[Zr] = 855, −18° C., 40 psig propylene.
[b]gPP/mol Zr.h.
[c]Determined by GPC vs. polystyrene.
[d]Determined by $^{13}$C NMR spectroscopy.
[e]BI = isotactic Block Index = 4 + 2 [mmmm]/[mmmr].

EXAMPLE 23

In a nitrogen filled drybox, a 200 mL Fischer-Porter bottle containing a magnetic stirring bar is charged with Akzo type 4A methylaluminoxane (7.4% Al, 1.69 g, 4.6 mmol) and bis(2-phenylindenyl)zirconium dichloride (3 mg, 5.5 µmol). Once removed from the drybox, toluene (50 mL) is transferred to the reactor using a stainless-steel cannula needle. After cooling to −18° C., the reactor is pressurized with 50 psig of propylene. Under these conditions propylene is a liquid. After stirring for 45 minutes, the motion of the magnetic stir bar becomes impeded due to polymer formation. After 2 hours and 15 minutes the reaction is quenched by injecting methanol (10 mL). The polymer is precipitated by the addition of methanol (50 mL), collected by filtration and dried overnight at 30° C. Crude yield: 9.26 g of a white rubbery solid. Productivity: 5.6×10$^5$ gPP/molZr.h. The mmmm pentad content by $^{13}$C NMR is 28.1% A $M_w$ of 889,000 and $M_w/M_n$ of 2.07 is determined by GPC versus polystyrene.

EXAMPLE 24 - Comparative Example Bridged Metallocene Produces Polymer Blend, Not Polymer Block In a nitrogen filled drybox, a 100 mL Schlenk tube containing a magnetic stirring bar is charged with rac/meso-ethylene-1,2-bis(2-phenyl-1-indenyl)zirconium dichloride (5 mg, 8.8 µmol) and dry Schering brand methylaluminoxane (1.04 g, 17.9 mmol). Once removed from the drybox, toluene (50 mL) is transferred to the reactor using a stainless-steel cannula needle. After aging for 5 minutes at 20° C., the green solution is placed under partial vacuum and propylene is added to the reactor at a pressure of 0.5 psig. The solution turns yellow-orange after 5 minutes. After spectroscopy, was 87.7%, indicative of an isotactic polypropylene. A $M_w$ of 124,000 and $M_w/M_n$ of 1.5 was determined by GPC versus polystyrene. A melting point of 142° C. ($\Delta H_f$=50.3 J/g) was observed by DSC.

EXAMPLE 25 - Comparative Example: Racemic ethylene-bridged 2-phenylindene catalyst produces isotactic polypropylene.

(a) The racemic and meso-isomers of ethylene-1,2-bis(2-phenyl-1-indenyl)zirconium dichloride were obtained as two types of crystals, orange cubes and yellow plates. The orange cubes were characterized as the racemic isomer and were separated from the meso isomer (yellow plates) manually in air by visual recognition and using tweezers to physically separate into like groups.

(b) In a nitrogen filled drybox, a 100 mL Schlenk tube containing a magnetic stirring bar is charged with rac-ethylene-1,2-bis(2-phenyl-1-indenyl)zirconium dichloride (5 mg, 8.8 µmol) and dry Schering brand methylaluminoxane (1.04 g, 17.9 mmol). Once removed from the drybox, toluene (50 mL) is transferred to the reactor using a stainless-steel cannula needle. After aging for 5 minutes at 20° C., the green solution is placed under partial vacuum and propylene is added to the reactor at a pressure of 0.5 psig. The solution turns yellow-orange after 5 minutes. After stirring for 2 hours at 20° C., the polymerization is quenched by the addition of methanol (10 mL). The polymer is collected by filtration, and dried overnight at 30° C. Crude yield: 8.85 g. The polymer is extracted into refluxing toluene, filtered, and dried in vacuo to yield a white powder. Productivity: 5.0×10⁵ gPP/molZr.h. The mmmm pentad content by $^{13}$C NMR is 68.1%. A $M_w$ of 16,800 and $M_w/M_n$ of 2.0 is determined by GPC versus polystyrene. A melting point of 113° C. ($\Delta H_f$=30.7 J/g) is observed by DSC. This polymer was clearly isotactic.

EXAMPLE 26 Comparison - Polymer Structure as a Function of Metal Type

In a nitrogen filled drybox, a 300 mL stainless-steel autoclave equipped with a mechanical stirrer was charged with the appropriate catalyst A (Zr) or C (Hf), methylaluminoxane and toluene (100 mL). Once removed from the drybox, the autoclave was warmed to 30° C., and propylene was added to the reactor at a pressure of 75 psig. After stirring for 10 minutes, the polymerization was quenched by injecting methanol (10 mL) at 250 psig. The autoclave was vented slowly and opened. The polymer was precipitated by the addition of methanol (150 mL), collected by filtration, and dried overnight at 30° C. The polymer was extracted into refluxing toluene, filtered, and dried in vacuo to yield a white rubbery solid. The results are summarized in Table 5; all pressures at 75 psig.

1.16 g of tough white rubbery solid. The mmmm pentad content by $^{13}$C NMR spectroscopy was 54%. A melting point of 141° C. ($\Delta H_f$=13.1 J/g) was observed by DSC. The remaining polymer in the thimble was transferred to a new thimble and extracted with refluxing xylenes for >20 hours. The polymer was precipitated in methanol, filtered, and dried in vacuo to yield 0.89 g of tough white rubbery solid. The mmmm pentad content by $^{13}$C NMR spectroscopy was 58%, <BI>=14. Total yield was 2.1 g.

EXAMPLE 28 - In a nitrogen filled drybox, a 300-ml stainless-steel Parr reactor equipped with a mechanical stirrer was charged with dry methylaluminoxane (MAO Type 4 Akzo, dried for >24 hours) (313 mg, 5.40 mmol) dissolved in 80 mL of toluene. A 50-mL pressure tube was charged with bis(2-(Bis-3,5-(trifluoromethyl)phenyl)indenyl)zirconium dichloride (4.4 mg, 5.39 µmol), Catalyst D, dissolved in 20 mL of toluene. The reactor was pressurized to 40 psig of propylene and the pressure slowly released in order to purge the system (3x). The reactor was heated to 60° C. and pressured with 75 psig of propylene. The pressure tube containing the catalyst precursor was pressurized to 225 psi with nitrogen. Once the MAO solution was saturated with propylene, the catalyst solution was injected into the reactor at 60° C. After stirring for one hour, the polymerization was quenched by injecting methanol (7 mL). The autoclave was then cooled to ambient temperature and slowly vented. The polymer was precipitated by the addition of methanol (400 mL), collected by filtration, and dried

TABLE 5

| | Propylene Polymerization with Catalysts Containing Different Metals | | | | | | | |
|---|---|---|---|---|---|---|---|---|
| Example | Catalyst | Temp (°C.) | Time (min) | Productivity (×10⁵)ᵃ | $M_w$ᵇ (×10³) | $M_w/M_n$ | % mmmmᶜ | BIᶠ |
| 26a | Aᵈ | 30 | 10 | 17.0 | 373 | 1.7 | 15.6 | 6.42 |
| 26b | Cᵉ | 30 | 10 | 15.5 | 170 | 1.9 | 7.7 | 5.12 |

ᵃgPP/mol Zr.h.
ᵇDetermined by GPC vs. polystyrene.
ᶜDetermined by $^{13}$C NRM spectroscopy.
ᵈ[Zr] = 5.5 × 10⁻⁵M, [Al]/[Zr] = 1000.
ᵉ[Hf] = 2.4 × 10⁻⁴M, [Al]/[Hf] = 958.
ᶠBI = Isotactic Block Index = 4 + 2 [mmmm]/[mmmr].

EXAMPLES 27, 28 Influence of Ligand on structure of Polypropylene

Example 27 - In a nitrogen filled drybox, a 300-mL stainless-steel Parr reactor equipped with a mechanical stirrer was charged with dry methylaluminoxane (MAO Type 4 Akzo, dried >24h) (237 mg, 5.64 µmol) dissolved in 80 mL of toluene. A 50-mL pressure tube was charged with Bis(2-(bis-3,5-(trifluoromethyl)phenyl)indenyl)zirconium dichloride, Catalyst D, (4.4 mg, 5.39 µmol) dissolved in 20 mL of toluene. The reactor was pressurized to 75 psig of propylene and the pressure slowly released in order to purge the system (3x). The reactor was then saturated with propylene (65 psig) with stirring. The pressure tube containing the metallocene was pressurized to 200 psi with nitrogen. Once the MAO solution was saturated with propylene, the catalyst solution was injected into the reactor at 28° C. The pressure was rapidly raised to 75 psi. After stirring for 1 hour, the polymerization was quenched by injecting methanol (7 mL). The autoclave was then slowly vented and opened. The polymer was precipitated by the addition of methanol (400 mL), collected by filtration, and dried overnight at ambient temperature. Crude yield: 3.2 g. The polymer was extracted into refluxing toluene for >30 h, precipitated in methanol, filtered, and dried in vacuo to yield overnight at ambient temperature. Crude yield: 2.23 g. The polymer was extracted into refluxing toluene, precipitated in methanol, filtered, and dried in vacuo to yield 1.77 g of a tacky rubbery solid. Productivity: 3.3×10⁵ gPP/molZr.h. The mmmm pentad content by $^{13}$C NMR spectroscopy was 21% <BI>=6.6. A $M_w$ of 164,000 and $M_w/M_n$ of 3.6 was determined by GPC versus polystyrene. A melting point of 136° C. ($\Delta H_f$=0.9 J/g) was observed by DSC.

EXAMPLE 29

In a nitrogen filled drybox, a 300-mL stainless-steel Parr reactor equipped with a mechanical stirrer was charged with dry methylaluminoxane (MAO Type 4 Akzo, dried >24 h) (356 mg, 6.14 mmol) dissolved in 100 mL of toluene. A 50 mL pressure tube was charged with Bis(2-(4-tert-butylphenyl)indenyl)zirconium dichloride, Catalyst F, (4.0 mg, 6.09 µmol) dissolved in 20 mL of toluene. The reactor was pressurized to 75 psig of propylene and the pressure slowly released in order to purge the system (3x). The reactor was then saturated with propylene (75 psig) with stirring. The pressure tube containing the catalyst precursor was pressurized to 200 psi with nitrogen. Once the MAO solution was saturated with propylene the catalyst solution was injected into the reactor at 27° C. After stirring for 1 hour, the polymerization was quenched by injecting methanol (7 mL). The autoclave was then slowly vented and opened. The polymer was precipitated by the addition of methanol (400 mL), collected by filtration, and dried overnight at ambient temperature. Crude yield: 4.11 g. A sample of the polymer (1.98 g) was extracted into refluxing xylenes, precipitated in methanol, filtered, and dried in vacuo to yield 1.77 g of white solid. The mmmm pentad content by $^{13}$CNMR spectroscopy was 27%, <BI>=8.1. A melting point of 133° C. ($\Delta H_f$=1.3 J/g) was observed by DSC.

EXAMPLES 30–32 - Polymerization of 1-Hexene, Borate Cocatalyst

A 20 mL Schlenk flask was charged with 5 mL of toluene, 2 mL of 1-hexene (16 mmol) and 0.0199 mmol of the appropriate zirconocene catalyst identified in Table 6 below and stirred for 5 min at 22° C. To this solution was added the cocatalysts, and the mixture was allowed to stir for 20 min. The polymerization was quenched by the addition of methanol. The polymer was isolated by filtration and dried in vacuo overnight to give a sticky clear solid. The results are summarized in Table 6.

TABLE 6

Polymerization of 1-Hexene-Comparison of Prior Art to 2-phenylindene dimethyl

| Example | Metallocene Catalyst | Cocatalyst Type | Cocatalyst Conc. ($\times 10^{-3}$M) | Productivity$^c$ ($\times 10^5$) | $M_w^d$ ($\times 10^3$) | $M_w/M_n$ |
|---|---|---|---|---|---|---|
| 30 | Ind$_2$ZrMe$_2^a$ | Borate$^b$ | 2.8 | 4.5 | 3.9 | 1.9 |
| 31 | Catalyst B | Borate$^b$ | 2.8 | 3.8 | 17.4 | 2.2 |
| 32 | Catalyst B | MAO | 236 | 3.3 | 11.3 | 2.4 |

$^a$Ind$_2$ZrMe$_2$ = Bis(indenyl)zirconium dimethyl, [Zr] = 2.7 × 10$^{-3}$M, a prior art catalyst.
$^b$Borate = [PhNMe$_2$H]$^+$B(C$_5$F$_6$)$_4^-$
$^c$g PP/(mol Zr × h).
$^d$Determined by GPC vs. polystyrene.

III. Mechanical Properties

EXAMPLE 33 - Sample Testing

The mechanical properties of samples of polymers produced by representative Examples above were tested and the results shown in Table 7 below. Runs 1 and 2 are polypropylene polymers produced under the conditions of Example 16, with Run 1 being product from Example 16 and Run 2 being a repeat under the same conditions of Example 16. Run 3 is product from a repeat of Example 27. Samples of the polymers (1.6 mm thick×3.2 mm long) were prepared by hot compression molding. The average mechanical properties of the polymers are listed in Table 7. Five polymer samples were tested in Run 1, four in Run 2, and 6 in Run 3.

TABLE 7

Mechanical Properties of Polypropylene Synthesized Using Catalysts A and D with MAO.

| Run and No. of Samples | Initial Modulus (psi) | Tensile Strength (psi) | Ultimate Elongation (%) | Tensile Set (%) |
|---|---|---|---|---|
| Run 1, Av. of 5 Samples | 246 | 443 | 960 | 44 |
| Run 2, Av. of 4 Samples | 193 | 512 | 3070 | 32 |
| Run 3, Av. of 6 Samples | 12,388 | 5040 | 130 | 197 |

DISCUSSION

The polypropylenes of the present invention exhibit a range of properties that are remarkable for a homopolymer. These polymers are homogeneous in composition, are of high molecular weight with low polydispersities, with $M_w$ between 200,000 and 1,800,000 easily being obtained, and are $M_w/M_n$ typically less than 5. By homogeneous in composition we mean that if the polymer can be fractionated by whatever solvent or solvent system(s), the different polymer fractions will still have close similar molecular weights and molecular weight distributions.

The upper service temperature of a thermoplastic elastomer is determined by the melting point of the polymer. The titanocene-based catalyst system developed by Chien (Chien, Llinas et al., 1991 [Ref. 2]; Chien, Babu et al., 1992 [Ref. 3]; Llinas, Dong et al.,1992 [Ref. 4]) produces lower molecular weight elastomeric polypropylenes with melting points between 51° and 66° C. In contrast, polypropylene synthesized by us using (2PhInd)$_2$ZrCl$_2$/MAO are of higher molecular weight and exhibit melting points as high as 145° C. The polypropylenes of this invention thus have unexpectedly high service temperatures.

The polypropylenes formed using catalysts of this invention are remarkably elastic. Typical isotactic polypropylene is characterized by a high initial modulus of up to 150,000 psi, a sharp yield at 20% elongation, tensile strengths of approximately 4,644 psi, and virtually no elastic recovery (tensile set=300%). In contrast, the polypropylene polymer of this invention made with catalyst A (Runs 1 and 2 in Table 7 above) has an initial modulus of 240 psi, exhibits no yield, a tensile strength of 500 psi and exhibits elastic recovery of over 90% (tensile set=30%). Ultimate elongations as high as 3000% for these polymers represent the highest reported values for a homopolymer of polypropylene. One of the unique features of this catalyst system is that the structure and therefore the properties of the polymer can be rationally controlled by parameters such as reaction temperature, monomer pressure and ligand substitutions. For example, polymers made with catalyst D (Example 27) exhibit initial modulus of 12,400 psi, no yield, tensile strengths of up to 5000 psi, and percent recovery of 34% (tensile set=197%), a remarkable and clearly unexpected degree of elastic recovery for a material with this tensile strength.

As shown in FIG. 2, for a given propylene pressure, the isotactic pentad content [mmmm] of the obtained polypropylene increases with decreasing polymerization temperature. At 0.5 psig of propylene, the isotactic pentad content increases from [mmmm]=6.3%, which is essentially amorphous atactic polypropylene, to [mmmm]=16.1%, which is a rubbery elastomeric polypropylene. The isotactic Block Index similarly increases from <BI>=5.02 at a polymerization temperature of 45° C. to <BI>=6.12 at a polymerization temperature of 25° C. The productivity and molecular weights of the polypropylenes also increase with decreasing polymerization temperature (Table 1).

As shown in FIG. 3 at the polymerization temperature of 0° C. the isotactic pentad content increases from [mmmm]=11.6% to 17.4%. The isotactic Block Index similarly increases from <BI>=5.58 at 5 psig to <BI>=6.19 at 75 psig. Table 2 shows the productivity and average Mw increases with increasing polypropylene pressure in the reactor.

FIG. 4 demonstrates an elastomeric polypropylene of this invention of isotactic pentad content [mmmm] of 28%, but at the same time very low syndiotactic content (the rr-centered pentad on the right in the figure), as compared to typical prior art polypropylenes.

FIG. 5 is a stress strain curve for a representative elastomeric polypropylene of this invention (Example 16), having an isotactic pentad content of 16%. It exhibits no yield (no dip in the curve), a continuous increase in stress value with elongation out to 1300%. The tensile strength is 500 psi.

It should be understood that various modifications within the scope of this invention can be made by one of ordinary skill in the art without departing from the spirit thereof. As one skilled in the art will recognize, by following the processes and procedures of this invention, methyl methacrylate may be polymerized to thermoplastic elastomeric polymethylmethacrylate employing Zirconium or Samarium unbridged metallocene catalyst systems of this invention. This polymer may be used as a safety interlayer in auto glass in place of polybutyl polymers. We therefore wish our invention to be defined by the scope of the appended claims as broadly as the prior art will permit, and in view of the specification if need be.

CITATIONS

1. Natta, G.; Crespi, G. (Montecatini), U.S. Pat. No. 3,175,999 (1965) (Chem. Abstr., 1961,55,14985b).
2. Chien, J. C. W.; Llinas, G. H.; Rausch, M. D.; Lin, G-Y.; Winter, H.H.; Atwood, J.L.; Bott, S.G., "Two-state Propagation Mechanism for Propylene Polymerization Catalyzed by rac-[anti-ethylidene(1-η⁵-tetramethylcyclopentadienyl) (1-η⁵-indenyl)] dimethyltitanium" *J. Am. Chem. Soc.* 1991, 113, 8569–8570.
3. Cheng, H. N.; Babu, G. N.; Newmark, R. A.; Chien, J.C.W., "Consecutive Two-State Statistical Polymerization Models" *Macromolecules* 1992, 25 6980–6987.
4. Llinas, G. H.; Dong, S. H.; Mallin, D. T.; Rausch, M. D.; Lin, Y. G.; Winter, M. H.; Chien, J.C.W., "Crystallineamorphous Block Polypropylene and Nonsymmetric and ansa-Metallocene Catalyzed Polymerization" *Macromolecules* 1992, 25, 1242–1253.
5. Zambelli, A.; Locatelli, P.; Bajo, G.; Bovey, F. A., "Model Compounds and ¹³C NMR Observation of Stereosequences of Polypropylene" Macromolecules 1975, 8, 687–689.
6. Randall, J. C., "Carbon13 Nuclear Magnetic Resonance Quantitative Measurements of Average Sequence Length of Like Stero-Chemical Additions in Propylene and Polystyrene" *J. Poly. Sci. Poly. Phys.* 1976, 14, 2083–2094.
7. Collette, J. W.; Ovenall, D. W.; Buck, W. H.; Ferguson, R. C., "Elastomeric Polypropylenes from Alumina-supported Tetraalkyl Group IVB Catalysts. 2. Chain Microstructure, Crystallinity, and Morphology" *Macromolecules* 1989, 22, 3858–3866.

We claim:

1. A transition metal compound useful with a cocatalyst as a polymerization catalyst, comprising a metallocene of the formula (L)(L')M(X)(X') wherein:

a. L and L' are hydrocarbon or substituted hydrocarbon ligands at least one of which is a substituted cyclopentadienyl ring and the other is a substituted cyclopentadienyl ring having the formula:

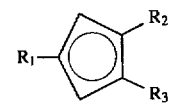

where $R_1$ is a, or $R_1$ and $R_2$ are, aryl or substituted aryl substituent(s) of the formula:

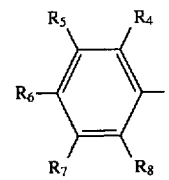

where $R_4$, $R_5$, $R_6$, $R_7$ and $R_8$ are hydrogen, halogen, aryl, hydrocarbyl, silahydrocarbyl or halohydrocarbyl substituents; and at least one of $R_2$ or $R_3$ are $C_1$–$C_{20}$ alkyl, $C_1$–$C_{20}$ alkylsilyl, or $R_2$ and $R_3$ are connected as a ring having at least three carbon atoms;

b. said ligands L and L' are selected to provide a preselected degree of steric hindrance to ligand rotation on their respective L-M and L'-M axes, said degree of hindrance being selected on the principle that sterically larger substituents provide a greater hindrance;

c. L and L' are rotatable about their respective L-M and L'-M bond axes on a time scale slower than that of monomer insertion but faster than the time to construct a polymer chain, to alternate between two distinct states characterizable as rac-like and meso-like states wherein:
      (1) when L=L', said metallocene alternates between chiral rac and achiral meso states; and
      (2) when L≠L', said metallocene alternates between a chiral rac-like state and a state which is chiral by virtue of the difference in substituents on the ligands, but meso-like in relative orientation of the two ligands including their substituents;

d. M is a Group 3, 4 or 5 Transition metal, a Lanthanide or an Actinide; and e. X and X' are uninegative hydride, halogen, alkoxide, hydrocarbyl, or halohydrocarbyl ligands.

2. A transition metal compound useful with a cocatalyst as a polymerization catalyst as in claim 1 wherein:

a. said L and L' ligands are both substituted cyclopentadienyl rings having the formula and the substituents set forth in part a of claim 1.

3. A transition metal compound useful with a cocatalyst as a polymerization catalyst as in claim 2 wherein:
   a) $R_1$ is aryl; and
   b) $R_2$ and $R_3$ are connected as a ring having at least three carbon atoms.

4. A transition metal compound useful with a cocatalyst as a polymerization catalyst as in claim 3 wherein:
   a) at least one of L and L' is a 2-aryl indene of the formula

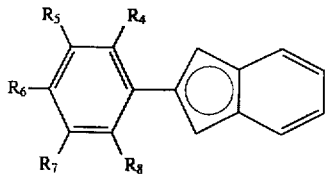

where $R_4$, $R_5$, $R_6$, $R_7$, and $R_8$ are hydrogen, halogen, aryl, hydrocarbyl, silahydrocarbyl or halohydrocarbyl substituents.

5. A transition metal compound useful with a cocatalyst as a polymerization catalyst as in claim 4 wherein:
   a) at least one of L and L' is: 2-phenylindene; 2-(3,5-dimethylphenyl)indene; 2-(3,5-bis-trifluoromethylphenyl)indene; 2-(4-fluorophenyl)indene; 2-(2,3,4,5-tetrafluorophenyl)indene; 2-(1-naphthyl)indene; 2-(2-naphthyl)indene; 2-[(4-phenyl)phenyl]indene; 2-[(3-phenyl)phenyl]indene; 2-4-t-butylphenyl)indene; or 2-(4-methylphenyl)indene.

6. A polymerization catalyst comprising:
   a) a compound as in claim 5 wherein M is Ti, Hf or Zr, and X is hydride, halogen, alkoxide or $C_1-C_7$ hydrocarbyl; and
   b) a cocatalyst to form a catalyst system.

7. A polymerization catalyst system as in claim 6 wherein said cocatalyst is an aluminoxane, methylaluminoxane, modified methylaluminoxane, a Lewis acid, or a protic acid containing a non-coordinating counter ion.

8. A polymerization process as in claim 7 wherein,
   (a) said Lewis acid cocatalyst is $B(C_6F_5)_3$; and
   (b) said protic acid cocatalyst is $[PhNMe_2H]^+B(C_6F_5)_4^-$.

9. A polymerization catalyst comprising:
   a) a compound as in claim 3 wherein M is Ti, Hf or Zr, and X is hydride, halogen, alkoxide or $C_1-C_7$ hydrocarbyl; and
   b) a cocatalyst to form a catalyst system.

10. A polymerization catalyst comprising:
    a) a compound as in claim 2 wherein M is Ti, Hf or Zr, and X is hydride, halogen, alkoxide or $C_1-C_7$ hydrocarbyl; and
    b) a cocatalyst to form a catalyst system.

11. A polymerization catalyst comprising:
    a) a compound as in claim 1 wherein M is Ti, Hf or Zr and X is hydride, halogen, alkoxide or $C_1-C_7$ hydrocarbyl; and
    b) a cocatalyst to form a catalyst system.

12. A polymerization catalyst system as in claim 11, wherein said cocatalyst is an aluminoxane, methylaluminoxane, modified methylaluminoxane, a Lewis acid, or a protic acid containing a non-coordinating counter ion.

13. A polymerization catalyst system as in claim 12 wherein:
    (a) said Lewis acid cocatalyst is $B(C_6F_5)_3$; and
    (b) said protic acid cocatalyst is $[PhNMe_2H]^+B(C_6F_5)_4^-$.

14. A polymerization catalyst system as in claim 11, wherein the transition metal compound component is: bis [2-phenylindenyl]zirconium dichloride ; bis[2-phenylindenyl]zirconium dimethyl; bis[2-(3,5dimethylphenyl)indenyl] zirconium dichloride; bis[2-(3,5-bistrifluoromethylphenyl)indenyl]zirconium dichloride; bis [2-(4,-fluorophenyl)indenyl]zirconium dichloride; bis[2-(2,3,4,5tetrafluorophenyl)indenyl]zirconium dichloride; bis[2-(1naphthyl)indenyl]zirconium dichloride; [2-(2-naphthhyl)indenyl]zirconium dichloride; bis[2-[(4-phenyl)phenyl]indenyl]zirconium dichloride; bis[2-[(3-phenyl)phenyl]indenyl]zirconium dichloride; bis[2-(4-t-butylphenyl)indenyl]zirconium dichloride; bis[2-phenyl(indenyl)]hafnium dichloride; bis[2-phenyl(indenyl)] hafnium dimethyl; bis[2-(3,5-dimethylphenyl)indenyl] hafnium dichloride; bis [2-phenyl(indenyl)]hafnium dimethyl; bis[2-3,5-dimethylphenyl)indenyl]hafnium dicholoride; bis [2-phenyl(indenyl)] hafnium dimethyl; bis [2-(4-fluorophenyl)indenyl]hafnium dichloride; bis[2-(2,3,4,5-tetrafluorophenyl)indenyl]hafnium dichloride; bis[2-(1-naphthyl)indenyl]hafnium dichloride; bis[2-(2-naphthyl)indenyl]hafnium dichloride; bis[2-[(4-phenyl)phenyl]indenyl]hafnium dichloride; bis[2-[(3-phenyl)phenyl]indenyl]hafnium dichloride; or bis[2-(4-t-butylphenyl)indenyl]hafnium dichloride.

15. A process for producing a polyolefin comprising the steps of:
    a) providing a metallocene reaction catalyst system comprising a cocatalyst and a transition metal compound of the formula (L)(L')M(X)(X') wherein:
       i) L and L' are hydrocarbon or substituted hydrocarbon ligands at least one of which is a substituted cyclopentadienyl ring and the other is a substituted cyclopentadienyl ring having the formula:

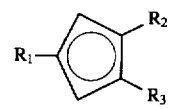

where $R_1$ is a, or $R_1$ and $R_2$ are, aryl or substituted aryl substituent(s) of the formula:

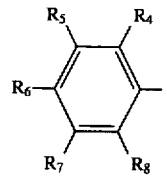

where $R_4$, $R_5$, $R_6$, $R_7$ and $R_8$ are hydrogen, halogen, aryl, hydrocarbyl, silahydrocarbyl or halohydrocarbyl substituents; and at least one of $R_2$ or $R_3$ are $C_1-C_{20}$ alkyl, $C_1-C_{20}$ alkylsilyl, or $R_2$ and $R_3$ are connected as a ring having at least three carbon atoms;
       ii) said ligands L and L' are selected to provide a preselected degree of steric hindrance to ligand rotation on their respective L-M and L'-M axes, said degree of hindrance being selected on the principle that sterically larger substituents provide a greater hindrance:
       iii) L and L are rotatable about their respective L-M and L'-M bond axes on a time scale slower than that of monomer insertion but faster than the time to construct a polymer chain, to alternate between two distinct states characterizable as rac-like and meso-like states wherein:
          (1) when L=L', said metallocene alternates between chiral rac and achiral meso states; and (2) when L≠L', said metallocene alternates between a chiral rac-like state and a state which is chiral by virtue of the difference in substituents on the ligands, but meso-like in relative orientation of the two ligands including their substituents;

iv) M is selected from a Group 3, 4 or 5 Transition metal, a Lanthanide or an Actinide;

v) X and X' are uninegative hydride, halogen, alkoxide, hydrocarbyl, or halohydrocarbyl ligands; and b) contacting at least one olefin monomer with said reaction catalyst system for a time sufficient to catalytically polymerize said monomer(s) to form a polymer.

16. A polymerization process as in claim 15 wherein:

a) said metallocene catalyst ligands L and L' are both substituted cyclopentadienyl rings having the formula and the substituents set forth in part a)i) of claim 15.

17. A polymerization process as in claim 16 wherein:

a) $R_1$ is aryl, and b) $R_2$ and $R_3$ are connected as a ring having at least three carbon atoms.

18. A polymerization process as in claim 17 wherein:

a) at least one of L and L' is a 2-aryl indene of the formula:

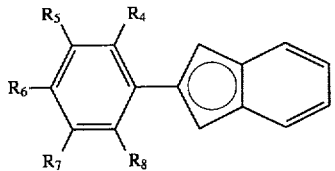

where $R_4$, $R_5$, $R_6$, $R_7$, and $R_8$ are hydrogen, halogen, aryl, hydrocarbyl, silahydrocarbyl or halohydrocarbyl substituents.

19. A polymerization process as in claim 18 wherein:

a) at least one of L and L' is: 2-phenylindene; 2-(3,5-dimethylphenyl)indene; 2-(3,5-bis-trifluoromethylphenyl)indene; 2-(4-fluorophenyl)indene; 2-(2,3,4,5-tetrafluorophenyl)indene; 2-(1-naphthyl)indene; 2-(2-naphthyl)indene; 2-[(4-phenyl)phenyl]indene; 2-[(3-phenyl)phenyl]indene; or 2-(4-t-butylphenyl)indene.

20. A polymerization process as in claim 18 wherein:

a) M is Ti, Hf or Zr; and b) X is halogen, alkoxide or $C_1$–$C_7$ hydrocarbyl.

21. A polymerization process as in claim 18 wherein said transition metal compound component of said catalyst is:

a) bis[2-phenylindenyl]zirconium dichloride; bis[2-phenylindenyl]zirconium dimethyl; bis[2-(3,5-dimethylphenyl)indenyl]zirconium dichloride; bis[2-(3,5-bis-trifluoromethylphenyl)indenyl]zirconium dichloride; bis[2-(4,-fluorophenyl)indenyl]zirconium dichloride; bis[2-(2,3,4,5tetrafluorophenyl)indenyl]zirconium dichloride; bis[2-(1-naphthyl)indenyl]zirconium dichloride; [2-(2-naphthyl)indenyl]zirconium dichloride; bis[2-[(4-phenyl)phenyl]indenyl]zirconium dichloride; bis[2-[(3-phenyl)phenyl]indenyl]zirconium dichloride; bis[2-4-t-butylphenyl)indenyl]zirconium dichloride; bis[2-phenyl(indenyl)]hafnium dichloride; bis[2-phenyl(indenyl)]hafnium dimethyl ; bis[2-(3,5-dimethylphenyl)indenyl]hafnium dichloride; bis[2-(3,5-bis-trifluoromethylphenyl)indenyl]hafnium dichloride; bis[2 -(4,-fluorophenyyl)indenyl]hafnium dichloride; bis[2-(2,3,4,5 -tetrafluorophenyl)indenyl]hafnium dichloride; bis[2-(1-naphthyl)indenyl]hafnium dichloride; bis[2-(2-naphthyl) indenyl]hafnium dichloride; bis[2-[(4-phenyl)phenyl]indenyl]hafnium dichloride; bis[2-[(3-phenyl)phenyl]indenyl]hafnium dichloride; or bis [2-(4-t-butylphenyl)indenyl]hafnium dichloride.

22. A polymerization process as in claim 17 wherein:

a) M is Ti, Hf or Zr; and b) X is halogen, alkoxide or $C_1$–$C_7$ hydrocarbyl.

23. A polymerization process as in claim 16 wherein:

a) M is Ti, Hf or Zr; and b) X is halogen, alkoxide or $C_1$–$C_7$ hydrocarbyl.

24. A polymerization process as in claim 15 wherein:

a) M is Ti, Hf or Zr; and b) X is halogen, alkoxide or $C_1$–$C_7$ hydrocarbyl.

25. A polymerization process as in claim 15 wherein:

a) said olefin monomer(s) are ethylene, alpha olefins or mixtures thereof.

26. A polymerization process as in claim 25 wherein:

a) said alpha olefin monomer(s) are propylene, 1-butene, 1-pentene, 4-methyl-1-pentene, 1-hexene or mixtures thereof.

27. A polymerization process as in claim 26 wherein:

a) at least one of said alpha olefin monomer is propylene.

28. A polymerization process as in claim 25 wherein:

a) said reaction is maintained for a time sufficient to produce an elastomeric thermoplastic poly-alpha olefin having a block index above about 5 and a weight average molecular weight above about 20,000.

29. A polymerization process as in claim 25 wherein:

a) said olefin is ethylene; and b) said reaction is maintained for a time sufficient to produce a polyethylene of high weight average molecular weight.

30. A polymerization process as in claim 15 wherein:

a) said cocatalyst is an aluminoxane, methylaluminoxane, modified methylaluminoxane, a Lewis acid, or a protic acid containing a non-coordinating counter ion.

31. A polymerization process as in claim 30 wherein:

a) said Lewis acid cocatalyst is $B(C_6F_5)_3$; and b) said protic acid cocatalyst is $[PhNMe_2H]^{30} B(C_6F_5)^-_4$.

32. A polymerization process as in claim 30 wherein:

a) said polymerization reaction is maintained at a temperature within the range of about −80° C. to about +100° C.; and the pressure of a reactor in which said polymerization takes place is in the range of from atmospheric to a pressure capable of maintaining the monomer in liquid form.

33. A polymerization process as in claim 15 wherein said reaction includes control of process conditions of at least one of temperature, pressure, monomer phase, monomer concentration, nature of the transition metal in said metallocene, nature of the cocatalyst, time, or combinations thereof.

34. A process for producing a polyolefin as in claim 33 wherein said monomer(s) phase is a gas phase, a solution phase, a slurry phase, a bulk phase, or combinations thereof.

35. A polymerization process as in claim 15 which includes at least one of the added steps of:

(a) selecting the transition metal;

(b) controlling the temperature of the reaction;

(c) selecting the concentration of the monomer, and (d) selecting the cocatalyst;

to control the structure and therefore the properties of the resulting polymer.

36. A polymerization process as in claim 35 wherein the property controlled by said process step is the block index.

37. A polymerization process as in claim 15 wherein:
(a) a single monomer is selected to produce a homopolymer; and
(b) said contact is maintained for a time sufficient to produce an atactic polymer having a weight average molecular weight above about 150,000.

38. A polymerization process as in claim 37 wherein said monomer is a linear or branched $C_3$-$C_{10}$ monomer.

39. A polymerization process as in claim 38 wherein said monomer is propylene, 1-butene, 1-pentene, 4-methyl-1-pentene, or 1-hexene.

40. A polymerization process as in claim 39 wherein said monomer is propylene.

41. A polymerization process as in claim 40 which includes the step of maintaining the reaction for a time sufficient to produce a homogeneous atactic polypropylene polymer having a weight average molecular weight above about 170,000.

42. A transition metal compound useful alone or with a cocatalyst as a polymerization catalyst comprising a metallocene of the formula (L)(L')Sm (X)(X') wherein:
a) L and L' are hydrocarbon or substituted hydrocarbon ligands;
b) said ligands L and L' are selected to provide a preselected degree of steric hindrance to ligand rotation on their respective L-Sm and L'-Sm axes, said degree of hindrance being selected on the principle that sterically larger substituents provide a greater hindrance;
c) L and L' are rotatable about their respective L-Sm and L'-Sm bond axes on a time scale slower than that of monomer insertion but faster than the time to construct a polymer chain, to alternate between two distinct states characterizable as rac-like and meso-like states wherein:
  i) when L=L', said metallocene alternates between chiral rac and achiral meso states; and
  ii) when L≠L', said metallocene alternates between a chiral rac-like state and a state which is chiral by virtue of the difference in substituents on the ligands, but meso-like in relative orientation of the two ligands including their substituents; and
d) X and X' are uninegative hydride, halogen, alkoxide, hydrocarbyl, or halohydrocarbyl ligands.

43. A transition metal compound useful alone or with a cocatalyst as a polymerization catalyst as in claim 42 wherein:
a) at least one of said L and L' ligands are substituted cyclopentadienyl rings having the formula:

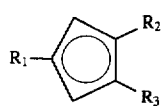

where $R_1$, $R_2$ and $R_3$ are $C_1$-$C_{20}$ alkyl, $C_1$-$C_{20}$ alkylsilyl, aryl or substituted aryl substituents, or $R_2$ and $R_3$ are connected as a ring having at least three carbon atoms.

44. A transition metal compound useful alone or with a cocatalyst as a polymerization catalyst as in claim 43 wherein:
a) $R_1$ is aryl or substituted aryl; and
b) $R_2$ and $R_3$ are connected as a ring having at least three carbon atoms.

45. A transition metal compound useful alone or with a cocatalyst as a polymerization catalyst as in claim 44 wherein:

a) at least one of L and L' is a 2-aryl indene of the formula:

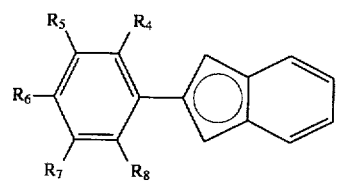

where $R_4$, $R_5$, $R_6$, $R_7$, and $R_8$ are hydrogen, halogen, aryl, hydrocarbyl, silahydrocarbyl or halohydrocarbyl substituents.

46. A polymerization process for producing a polyacrylate comprising the steps of:
a) providing a polymerization compound of the formula (L)(L')M(X)(X'), alone or with a cocatalyst, wherein:
  (1) M is selected from Zr, or Hf or Sm;
  (2) L and L' are hydrocarbon or substituted hydrocarbon ligands;
b) said ligands L and L' are selected to provide a preselected degree of static hindrance to ligand rotation on their respective L-M and L'-Maxes, said degree of hindrance being selected on the principle that sterically larger substituents provide a greater hindrance;
c) L and L' are rotatable about their respective L-M and L'-M bond axes on a time scale slower than that of monomer insertion but faster than the time to construct a polymer chain, to alternate between two distinct states characterizable as rac-like and meso-like states wherein:
  i) when L=L', said metallocene alternates between chiral rac and achiral meso states; and
  ii) when L≠L', said metallocene alternates between a chiral rac-like state and a state which is chiral by virtue of the difference in substituents on the ligands, but meso-like in relative orientation of the two ligands including their substituents;
d) X and X' are uninegative hydride, halogen, alkoxide, hydrocarbyl, or halohydrocarbyl ligands; and
e) contacting an acrylate monomer with said compound or catalyst system for a time sufficient to catalytically polymerize said monomer to form a polymer.

47. A polymerization process as in claim 46 wherein said monomer is methyl methacrylate.

48. A process for producing a polyacrylate as in claim 46 wherein said transition metal compound is employed with a cocatalyst.

49. In a method of polymerization of olefin monomers by contacting at least one olefin monomer with a metallocene catalyst/cocatalyst system, the improvement which comprises the steps of:
a) providing a metallocene having a pair of hydrocarbon or substituted hydrocarbon ligands L and L' independently rotatable about a ligand-metal bond, at least one of which ligands is a substituted cyclopentadiene ring and the other is a substituted cyclopentadienyl ring having the formula:

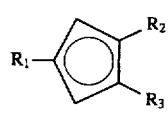

where $R_1$ is a, or $R_1$ and $R_2$ are, aryl or substituted aryl substituent(s) of the formula;

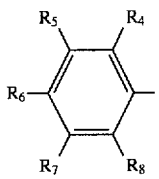

where $R_4$, $R_5$, $R_6$, $R_7$ and $R_8$ are hydrogen, halogen, aryl, hydrocarbyl, silahydrocarbyl or halohydrocarbyl substituents; and at least one of $R_2$ or $R_3$ are $C_1$–$C_{20}$ alkyl, $C_1$–$C_{20}$ alkylsilyl, or $R_2$ and $R_3$ are connected as a ring having at least three carbon atoms;

b) controlling the rate of rotation of said ligands by selecting ligand substituents to provide a preselected degree of static hindrance to ligand rotation on said ligand-metal bond, said degree of hindrance being selected on the principle that sterically larger substituents provide greater hindrance, said hindered rotation permitting said catalyst to alternate between two distinct states, wherein the rate of rotation between said states is less than the rate of monomer addition at the catalyst active site such that the lifetime of a given state is greater than the time required for insertion of a monomer unit to a growing polymer chain but shorter than the time required to form said polymer chain;

c) said states are characterizable as rac-like and meso-like states wherein:
  i) when L=L' said metallocene alternates between chiral rac and achiral meso states; and
  ii) when L≠L' said metallocene alternates between a chiral rac-like state and a state which is chiral by virtue of the difference in substituents on the ligands, but meso-like in relative orientation of the two ligands including their substituents; and d) reacting said monomer(s) for a time sufficient to produce an alpha olefin block polymer having a block index of greater than about 5, and elastomeric properties.

50. An improved method of polymerization as in claim 49 wherein said olefin monomer(s) are ethylene, alpha olefins, or mixtures thereof.

51. An improved method of polymerization as in claim 50 wherein said alpha olefin monomer(s) are propylene, 1-butene, 1-pentene, 4-methyl-1-pentene, 1-hexene or mixtures thereof.

52. An improved method of polymerization as in claim 51 wherein at least one of said alpha olefin monomer(s) is propylene.

53. A polymerization process as in claim 49 wherein said reaction includes control of process conditions of at least one of temperature, pressure, monomer phase, monomer concentration, nature of the transition metal in said metallocene, nature of the cocatalyst, time, or combinations thereof.

54. A process for producing a polyolefin as in claim 53 wherein said monomer(s) phase is a gas phase, a solution phase, a slurry phase, a bulk phase, or combinations thereof.

55. A polymerization process as in claim 49 which includes at least one of the added steps of:
  (a) selecting the transition metal;
  (b) controlling the temperature of the reaction;
  (c) selecting the concentration of the monomer, and
  (d) selecting the cocatalyst;
to control the structure and therefore the properties of the resulting polymer.

56. A polymerization process as in claim 55 wherein the property controlled by said process step is the block index.

57. A polymerization process as in claim 49 wherein:
  (a) a single monomer is selected to produce a homopolymer; and
  (b) said contact is maintained for a time sufficient to produce an atactic polymer having a weight average molecular weight above about 150,000.

58. A polymerization process as in claim 57 wherein said monomer is a linear or branched $C_3$–$C_{10}$ monomer.

59. A polymerization process as in claim 58 wherein said monomer is propylene, 1-butene, 1-pentene, 4-methyl-1-pentene, or 1-hexene.

60. A polymerization process as in claim 59 wherein said monomer is propylene.

61. A polymerization process as in claim 60 which includes the step of maintaining the reaction for a time sufficient to produce a homogeneous atactic polypropylene polymer having a weight average molecular weight above about 170,000.

62. A polymerization process as in claim 49 wherein:
  a) said cocatalyst is an aluminoxane, a methylaluminoxane, a modified methylaluminoxane, a Lewis acid, or a protic acid containing a non-coordinating counterion.

63. A polymerization process as in claim 62 wherein:
  a) said Lewis acid cocatalyst is $B(C_6F_5)_3$; and
  b) said protic acid cocatalyst is $[PhNMe_2H]^+B(C_6F_5)_4^-$.

* * * * *